United States Patent
Ramadan et al.

(10) Patent No.: US 12,164,225 B2
(45) Date of Patent: Dec. 10, 2024

(54) SYSTEM, METHOD, AND PROGRAM PRODUCT FOR MANUFACTURING A PHOTOMASK

(71) Applicant: Photronics, Inc., Brookfield, CT (US)

(72) Inventors: Mohamed Ramadan, Meridian, ID (US); Michael Green, Boise, ID (US); Young Ham, Meridian, ID (US); Christopher J. Progler, Plano, TX (US)

(73) Assignee: Photronics, Inc., Brookfield, CT (US)

( * ) Notice: Subject to any disclaimer, the term of this patent is extended or adjusted under 35 U.S.C. 154(b) by 864 days.

(21) Appl. No.: 17/245,113

(22) Filed: Apr. 30, 2021

(65) Prior Publication Data

US 2021/0341832 A1    Nov. 4, 2021

Related U.S. Application Data

(60) Provisional application No. 63/018,471, filed on Apr. 30, 2020.

(51) Int. Cl.
| | |
|---|---|
| *G03F 1/70* | (2012.01) |
| *G06F 30/398* | (2020.01) |
| *G06T 7/00* | (2017.01) |
| *G06T 7/13* | (2017.01) |
| *G06T 7/70* | (2017.01) |
| *G06F 119/18* | (2020.01) |

(52) U.S. Cl.
CPC ............. *G03F 1/70* (2013.01); *G06T 7/001* (2013.01); *G06T 7/13* (2017.01); *G06T 7/70* (2017.01); *G06F 30/398* (2020.01); *G06F 2119/18* (2020.01); *G06T 2207/10061* (2013.01); *G06T 2207/30148* (2013.01)

(58) Field of Classification Search
None
See application file for complete search history.

(56) References Cited

U.S. PATENT DOCUMENTS

| | | | |
|---|---|---|---|
| 9,965,901 B2 | 5/2018 | Zhang et al. | |
| 10,558,127 B2 | 2/2020 | Shinoda et al. | |
| 2002/0164064 A1* | 11/2002 | Karklin | G03F 7/705 |
| | | | 382/199 |

(Continued)

FOREIGN PATENT DOCUMENTS

| | | |
|---|---|---|
| TW | I552245 B | 10/2016 |
| TW | 201935312 A | 9/2019 |
| WO | 2021/043936 A1 | 3/2021 |

OTHER PUBLICATIONS

Taiwan Office Action issued to Application No. 110115801, dated Nov. 22, 2022.

(Continued)

*Primary Examiner* — Vincent Rudolph
*Assistant Examiner* — Meredith Taylor
(74) *Attorney, Agent, or Firm* — Amster, Rothstein & Ebenstein LLP

(57) ABSTRACT

Methods and systems for building a photomask from obtained pattern information relating to a photomask that exhibits defects on wafer. Spatial domain analysis is conducted on the pattern information so that corrective photomask structures can be generated and applied to a photomask layout. A photomask is built using the corrective photomask structures. The photomask is verified for effectiveness.

18 Claims, 22 Drawing Sheets

(56) References Cited

U.S. PATENT DOCUMENTS

| | | |
|---|---|---|
| 2011/0276935 A1 | 11/2011 | Fouquet et al. |
| 2013/0174102 A1 | 7/2013 | Leu |
| 2017/0309008 A1 | 10/2017 | Shi et al. |
| 2020/0096857 A1 | 3/2020 | Huang et al. |

OTHER PUBLICATIONS

Tsutomu Murakawa et al., "Photomask quality evaluation using lithography simulation and precision SEM image contour data," Proceedings of SPIE, vol. 8522, Photomask Technology 852226, Nov. 8, 2012.

International Search Report received for PCT Patent Application No. PCT/US2021/30064, mailed on Aug. 5, 2021, 2 pages.

Written Opinion received for PCT Patent Application No. PCT/US2021/30064, mailed on Aug. 5, 2021, 12 pages.

* cited by examiner

```
Tool output Log file
Picture is: input_image.bmp
NCAR contour layer 20, smoothed NCAR contour layer 21
PCAR contour layer 10, smoothed PCAR contour layer 11
Picture Intensity Max: 153
Picture Intensity Min: 18
Picture Intensity Mean: 91.495379447793701
Picture Intensity Median: 108.0
Picture Intensity STD: 29.375271598914587
Suggested tolerance value is: 61.504628552063299
Picture Scale in X: 0.938291
Picture Scale in Y: 0.938892
Threshold used: 61.504628552063299
Smoothing value used in nm: 2
Ignoring any noise area below: 1500nm^2
background area size (used to get NCAR/PCAR contour): 1000000
finished Contour Extraction from Image: input_image.bmp
```

*Image information*

*Threshold calculated using the Machine Learnt model*

*Meta data used for extracted contour optimization*

FIG. 5

RnD_SEM2GDS_CMD.py -rd l=image_location [options]

- options are:
  - Manually set the pixel selection tolerance use: -rd T=..., default is calculated for each image.
  - Manually set the smooth value use: -rd S=..., default 2nm.
  - Manually set the tone -rd Tone=clear or dark, default is calculated for each image.
  - Manually ignore any noise area size set -rd ignore_area=.... in nm2, default is 1500nm2
  - Manually enter background area size set -rd bk_area=... in nm2, default is 1000,000nm2
  - Manually set scale in X -rd ScaleX=..., default is 1 if not defined in the SEM image
  - Manually set scale in Y -rd ScaleY=..., default is 1 if not defined in the SEM image
  - Enter oasis/gds file to get merged with the extracted contour -rd Design=oasis_designfile, default is none

FIG. 6

Corner rounding enhancement and H/V bias Design applied to all cells

| CR | L (nm) | W (nm) |
|---|---|---|
| No CR | 0 | 0 |
| Treatment 1 | A | B |
| Treatment 2 | C | D |

| Cells | noCR | CR1 | CR2 |
|---|---|---|---|
| Line | Y | Y | Y |
| Dot Ortho | Y | Y | Y |
| DOT Staggered | Y | Y | Y |
| LEND | Y | Y | Y |
| Space | Y | Y | Y |
| HOLE Ortho | Y | Y | Y |
| HOLE Staggered | Y | Y | Y |
| SEND | Y | Y | Y |

Dose modulation design

| Cells for DM | Dose 0 | Dose 1 | Dose 2 | Dose 3 |
|---|---|---|---|---|
| Line | 100 | D1 | D2 | D3 |
| Dot Ortho | 100 | D1 | D2 | D3 |
| DOT Staggered | 100 | D1 | D2 | D3 |
| LEND | 100 | D1 | D2 | D3 |

FIG. 13

| MRC Rule | W LL | W UL | LLL | LUL | L | W |
|---|---|---|---|---|---|---|
| CR1 | | | | | | |
| CR2 | | | | | | |
| CR3 | | | | | | |
| CR4 | | | | | | |
| CR5 | | | | | | |
| CR6 | | | | | | |
| CR7 | | | | | | |

FIG. 18

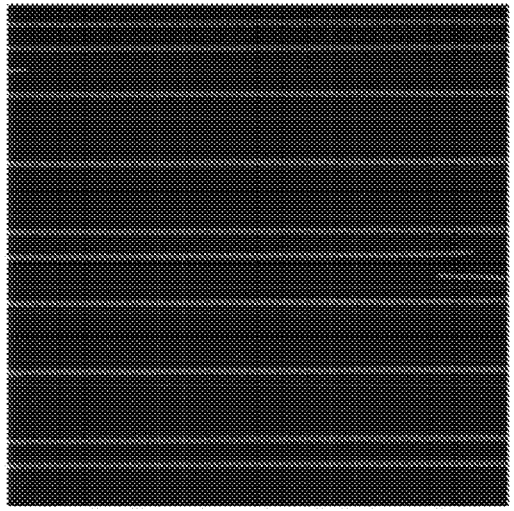
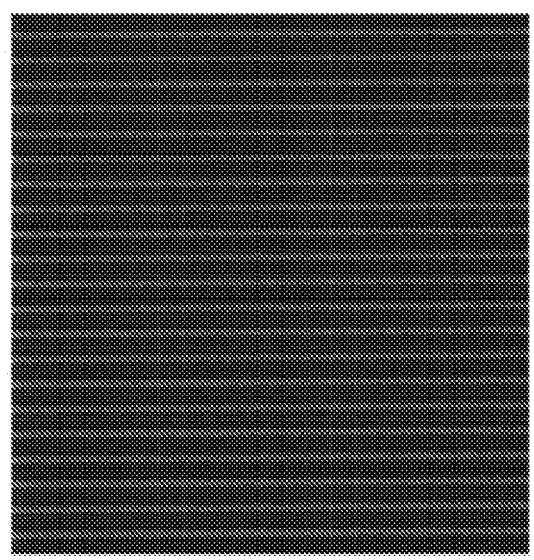
FIG. 19

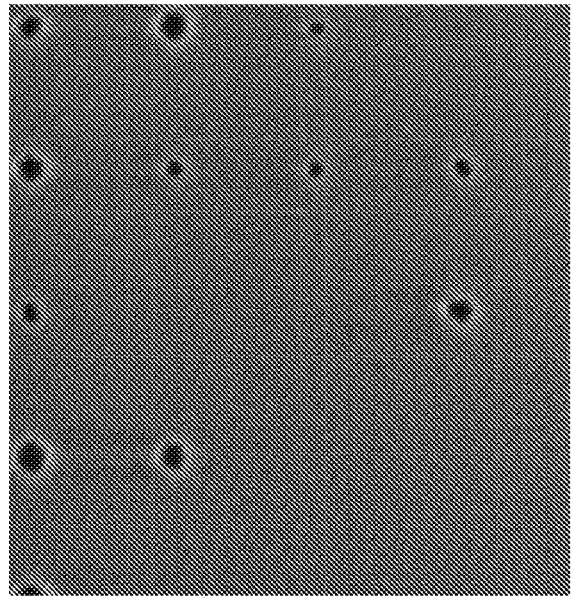
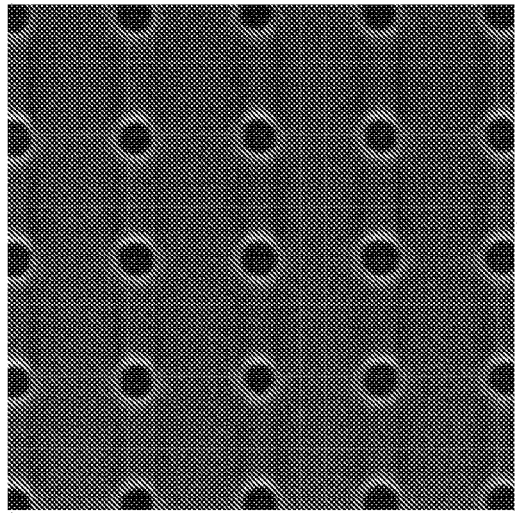
FIG. 21

SYSTEM, METHOD, AND PROGRAM PRODUCT FOR MANUFACTURING A PHOTOMASK

CROSS-REFERENCE TO RELATED APPLICATIONS

This application claims the benefit of and priority to U.S. Provisional Patent Application No. 63/018,471, filed on Apr. 30, 2020, the contents of which are herein incorporated by reference in their entirety into the present application.

FIELD

The present invention generally relates to systems and methods for manufacturing photomasks used in manufacturing integrated circuits on silicon wafers.

BACKGROUND

Mask technology is key to enabling the progression of advanced integrated circuit technology nodes for logic and memory processes. In particular, when pushing the traditional limits of optical and EUV lithography, masks are relied on heavily in order to achieve adequate process window (PW) and final yields. The mask manufacturing limits create technological challenges on how to maximize the accuracy and consistency of mask made as line widths become smaller and smaller with each new generation of advanced integrated circuit technology. Wafer verification of mask process improvements can be very difficult and time consuming with production lines running at full capacity and the level of effort to support wafer characterization. It is therefore useful for mask manufacturers and wafer lithographers if a method to more efficiently and effectively provide pattern fidelity enhancement solutions, whereas pattern fidelity includes but not limited to critical dimension uniformity (CDU—global and local, corner rounding, H/V bias, reproduction of complex 2D patterns, LER, enhance resolution, etc.).

Currently, utilizing a toolkit of mask and wafer analytical techniques within the lithography aware LAMA application, it is possible to predict wafer defectivity on one-dimensional (1D) and two-dimensional (2D) structures such as those found on metal, contact, poly, etc. and optimize a mask process for enhanced pattern fidelity performance. Contact hole area loss, corner rounding (CR), and mask process-induced x-y error on asymmetric holes, to name a few, present technological challenges on how to be optimized to deliver the required capability. Additionally, sub-resolution assist features (SRAFs) presents further technological challenges that can be addressed with this techniques. Resolving these on the mask is pose significant technological challenges, particularly when looking to extend process capability with previous generation equipment. A process for mask development to overcome these technological challenges is needed.

In addition, with higher demand on mask performance with advancements in IC technology nodes, conventional tools such as single-beam writing tools may no longer provide the desired results to meet these higher standards, while at the same time these conventional tools are not necessarily rendered obsolete for other purposes. Thus, there is a need to extend the capabilities of the conventional tools to allow for their use in higher mask performance realms, such as in the EUVL realm.

What is needed is a system and method by which a photomask can overcome the foregoing issues can be developed.

SUMMARY

The present invention addresses the challenge of achieving enhanced pattern fidelity in EUVL and optical lithography for integrated circuit yield with new and improved computer systems and methods for manufacturing a photomask that utilizes Litho Aware Mask Process correction Application (LAMA) techniques. As described below, LAMA is a multi-step data flow in which mask process LAMA fidelity is harmonized with wafer processes to enhance lithographic performance and yield patterning. In embodiments of the LAMA technique, a LAMA gauge pattern is designed based on spatial domain analysis of pre-existing photomask data and/or a SEM image contour extraction analysis of mask that has already been built. The designed LAMA gauge pattern, consisting of corrective photomask structures, is then incorporated into a mask. In embodiments, design rule checking and/or pattern matching software is used to determine what structures are present in the mask data and defects in those structures are quantified with a spatial domain analysis including but not limited to descriptive pattern search, feature statistical analysis and design density maps. Structures that may benefit from LAMA are thus identified. An initial mask is built in order to gain mask level data required to determine the optimum correction method for the mask structures. Based on this, an LAMA correction script will be applied to subsequent mask data generation. A final mask is then built with LAMA applied. LAMA correction can be applied during Mask Process Correction, OPC or any other mask preparation steps to generate the mask data to be used in production.

In embodiments, a method of manufacturing a photomask comprises: (a) detecting wafer defects from a scanning electron microscope (SEM) image of a wafer; (b) extracting a plurality of mask contours from a SEM image of a previously manufactured photomask, wherein the extracted mask contours may correspond to the detected wafer defects; (c) generating a simulated manufactured wafer using the extracted plurality of mask contours; (d) detecting one or more defects on the simulated manufactured wafer; (e) determining one or more problematic areas of the photomask based on the defects on the simulated manufactured wafer; (f) obtaining pattern information relating to the problematic areas of the previously manufactured photomask; (g) conducting a spatial domain analysis of the pattern information; (h) determining, based on the spatial domain analysis, a plurality of photomask structure patterns that exhibit one or more corresponding defects; (i) generating a plurality of potential corrected photomask structure patterns from the plurality of photomask structure patterns based on the spatial domain analysis, wherein the generating comprises: (i) selecting a plurality of treatments to be applied to the plurality of photomask structure patterns that exhibit one or more corresponding defects; and (ii) for each selected treatment, selecting a plurality of parameters corresponding to the treatment; and (iii) applying the selected treatments with the selected parameters to the plurality of photomask structure patterns that exhibit one or more corresponding defects; (j) incorporating the potential corrective photomask structure patterns into a test photomask; (k) analyzing the potential corrective photomask structure patterns on the test photomask; (l) selecting a plurality of corrective photomask structure patterns from the plurality of potential corrective photomask structure pattern; (m) generating one or more photomask pattern correction scripts based on the analysis of the plurality of corrective mask structure patterns on the test photomask; (n) executing the one or more photomask pattern correction scripts to apply one or more of the plurality of corrective photomask structure patterns to a photomask layout for a full layer; (o) building a photomask for the full layer that has incorporated therein the one or more of the plurality of corrective photomask structure patterns based on the final photomask layout; (p) confirming that the one or more corrective photomask structure patterns have been applied to the final photomask; and (q) determining that a plurality of locations on a wafer produced based on the photomask that has incorporated therein the one or more of the plurality of corrective photomask structure patterns do not exhibit defects corresponding to the one or more defects by a previously manufactured photomask.

In embodiments, the pattern information comprises one or more data files corresponding to a layout of a previously manufactured photomask.

In embodiments, the spatial domain analysis comprises: (i) conducting a pattern descriptive search of the pattern information; (ii) identifying photomask structures from the pattern information based on the pattern descriptive search; and (iii) generating a graph corresponding to the identified photomask structures. In embodiments, the plurality of photomask structure patterns that exhibit one or more corresponding defects are identified based on the graph corresponding to the identified photomask structures.

In embodiments, analyzing the corrective photomask structure patterns on the test photomask comprises: (i) executing a manufacturing simulation process based on the photomask; and (ii) evaluating results of the manufacturing simulation process.

In embodiments, the potential corrective photomask structure patterns are incorporated into unused space on a manufactured photomask.

In embodiments, a method of manufacturing a photomask comprises: (a) detecting wafer defects from a scanning electron microscope (SEM) image of a wafer; (b) extracting a plurality of mask contours from a SEM image of a previously manufactured photomask, wherein the extracted mask contours correspond to the detected wafer defects; (c) generating a simulated manufactured wafer using the extracted plurality of mask contours; (d) detecting one or more defects on the simulated manufactured wafer; (e) determining one or more problem areas of the previously manufactured photomask based on the defects on the simulated manufactured wafer; (f) obtaining pattern information relating to the problem areas of the previously manufactured photomask; (g) conducting a spatial domain analysis of the pattern information; (h) determining, based on the spatial domain analysis, a plurality of photomask structure patterns that exhibit one or more corresponding defects; (i) generating a plurality of corrective photomask structure patterns from the plurality of photomask structure patterns based on the spatial domain analysis, wherein the generating comprises: (i) selecting a plurality of treatments to be applied to the plurality of photomask structure patterns that exhibit one or more corresponding defects; and (ii) for each selected treatment, selecting a plurality of parameters corresponding to the treatment; and (iii) applying the selected treatments with the selected parameters to the plurality of photomask structure patterns that exhibit one or more corresponding defects; (j) generating one or more photomask pattern correction scripts based on the plurality of corrective photomask structure patterns; (k) executing the one or more photomask pattern correction scripts to apply one or more of the plurality of corrective photomask structure patterns to a photomask layout; (l) building a photomask that has incorporated therein the one or more of the plurality of corrective photomask structure patterns based on the final photomask layout of a layer; (m) confirming that the one or more corrective photomask structure patterns have been applied to the photomask; and (n) determining that a plurality of locations on a wafer produced based on the photomask that has incorporated therein the one or more of the plurality of corrective photomask structure patterns do not exhibit defects corresponding to the one or more defects by a previously manufactured photomask.

In embodiments, the pattern information comprises one or more data files corresponding to a layout of a previously manufactured photomask.

In embodiments, the spatial domain analysis comprises: (i) conducting a pattern descriptive search of the pattern information; (ii) identifying photomask structures from the pattern information based on the pattern descriptive search; and (iii) generating a graph corresponding to the identified photomask structures. In embodiments, the plurality of photomask structure patterns that exhibit one or more corresponding defects are identified based on the graph corresponding to the identified photomask structures.

In embodiments, the corrective photomask structure patterns are incorporated into unused space on a previously manufactured photomask.

In embodiments, a system for manufacturing a photomask comprises: one or more processing units; and a memory, wherein the one or more processing units are configured to execute machine-readable instructions that, when executed, cause the system to: (a) detect wafer defects from a scanning electron microscope (SEM) image of a wafer; (b) extract a plurality of mask contours from a SEM image of a previously manufactured photomask, wherein the extracted mask contours correspond to the detected wafer defects; (c) generate a simulated manufactured wafer using the extracted plurality of mask contours; (d) detect one or more defects on the simulated manufactured wafer; (e) determine one or more problematic areas of the photomask based on the defects on the simulated manufactured wafer; (f) obtain pattern information relating to the problematic areas of the previously manufactured photomask; (g) conduct a spatial domain analysis of the pattern information; (h) determine, based on the spatial domain analysis, a plurality of photomask structure patterns that exhibit one or more corresponding defects; (i) generate a plurality of potential corrected photomask structure patterns from the plurality of photomask structure patterns based on the spatial domain analysis, wherein the generating comprises: (i) selecting a plurality of treatments to be applied to the plurality of photomask structure patterns that exhibit one or more corresponding defects; and (ii) for each selected treatment, selecting a plurality of parameters corresponding to the treatment; and (iii) applying the selected treatments with the selected parameters to the plurality of photomask structure patterns that exhibit one or more corresponding defects; (j) incorporate the potential corrective photomask structure patterns into a test photomask; (k) analyze the potential corrective photomask structure patterns on the test photomask; (l) select a plurality of corrective photomask structure patterns from the plurality of potential corrective photomask structure pattern; (m) generate one or more photomask pattern correction scripts based on the analysis of the plurality of corrective mask structure patterns on the test photomask; (n) execute the one or more photomask pattern correction scripts to apply one or more of the plurality of corrective photomask structure patterns to a final photomask layout for a full layer; (o) build a photomask for the full layer that has incorporated therein the one or more of the plurality of corrective photomask structure patterns based on the final photomask layout; (p) confirm that the one or more corrective photomask structure patterns have been applied to the final photomask; and (q) determine that a plurality of locations on a wafer produced based on the photomask that has incorporated therein the one or more of the plurality of corrective photomask structure patterns do not exhibit defects corresponding to the one or more defects by a previously manufactured photomask.

In embodiments, the pattern information comprises one or more data files corresponding to a layout of a previously manufactured photomask.

In embodiments, the spatial domain analysis comprises: (i) conducting a pattern descriptive search of the pattern information; (ii) identifying photomask structures from the pattern information based on the pattern descriptive search; and (iii) generating a graph corresponding to the identified photomask structures. In embodiments, the plurality of photomask structure patterns that exhibit one or more corresponding defects are identified based on the graph corresponding to the identified photomask structures.

In embodiments, analyzing the corrective photomask structure patterns on the test photomask comprises: (i) executing a manufacturing simulation process based on the test photomask; and (ii) visually inspecting a result of the manufacturing simulation process.

In embodiments, the potential corrective photomask structure patterns are incorporated into unused space on a previously manufactured photomask.

In embodiments, a system for manufacturing a photomask comprises: one or more processing units; and a memory, wherein the one or more processing units are configured to execute machine-readable instructions that, when executed, cause the system to: (a) detect wafer defects from a scanning electron microscope (SEM) image of a wafer; (b) extract a plurality of mask contours from a SEM image of a previously manufactured photomask, wherein the extracted mask contours correspond to the detected wafer defects; (c) generate a simulated manufactured wafer using the extracted plurality of mask contours; (d) detect one or more defects on the simulated manufactured wafer; (e) determine one or more problem areas of the previously manufactured photomask based on the defects on the simulated manufactured wafer; (f) obtain pattern information relating to the problem areas of the previously manufactured photomask; (g) conduct a spatial domain analysis of the pattern information; (h) determine, based on the spatial domain analysis, a plurality of photomask structure patterns that exhibit one or more corresponding defects; (i) generate a plurality of corrective photomask structure patterns from the plurality of photomask structure patterns based on the spatial domain analysis, wherein the generating comprises: (i) selecting a plurality of treatments to be applied to the plurality of photomask structure patterns that exhibit one or more corresponding defects; and (ii) for each selected treatment, selecting a plurality of parameters corresponding to the treatment; and (iii) applying the selected treatments with the selected parameters to the plurality of photomask structure patterns that exhibit one or more corresponding defects; (j) generate one or more photomask pattern correction scripts based on the plurality of corrective photomask structure patterns; (k) execute the one or more photomask pattern correction scripts to apply one or more of the plurality of corrective photomask structure patterns to a photomask layout; (l) build a photomask that has incorporated therein the one or more of the plurality of corrective photomask structure patterns based on the final photomask layout of a layer; (m) confirm that the one or more corrective photomask structure patterns have been applied to the photomask; and (n) determine that a plurality of locations on a wafer produced based on the photomask that has incorporated therein the one or more of the plurality of corrective photomask structure patterns do not exhibit defects corresponding to the one or more defects by a previously manufactured photomask.

In embodiments, the pattern information comprises one or more data files corresponding to a layout of a previously manufactured photomask.

In embodiments, the spatial domain analysis comprises: (i) conducting a pattern descriptive search of the pattern information; (ii) identifying photomask structures from the pattern information based on the pattern descriptive search; and (iii) generating a graph corresponding to the identified photomask structures. In embodiments, the plurality of photomask structure patterns that exhibit one or more corresponding defects are identified based on the graph corresponding to the identified photomask structures.

In embodiments, the corrective photomask structure patterns are incorporated into unused space on a previously manufactured photomask.

In embodiments, a mask design correction system, comprising one or more computer systems each including one or more processors operatively connected to one or more memory devices and a plurality of modules stored in the one or more memory devices and programmed to run on one or more of the one or more processors, the plurality of modules comprising: (a) a scanning module configured to: (1) scan a first scanning electron microscope (SEM) image of a layer in a wafer; (2) detect wafer defects from the first SEM image of a wafer; and (3) output locations on the wafer having the wafer defects; (b) a contour extraction module operatively connected to the scanning module and configured to: (1) obtain the locations on the wafer having wafer defects; and (2) extract a plurality of mask contours from a second SEM image of a previously manufactured photomask associated with the layer in the wafer, wherein the extracted mask contours correspond to location on the previously manufactured photomask that correspond to the detected wafer defects of the wafer; (c) a simulation module operatively connected to the contour extraction module and configured to: (1) obtain the plurality of extracted mask contours; and (2) generate a simulated manufactured wafer using the extracted plurality of mask contours; (d) a detection module operatively connected to the simulation module and configured to: (1) obtain the simulated manufactured wafer; (2) detect one or more defects on the simulated manufactured wafer; (3) output data including the defects on the simulated manufactured wafer; (e) a photomask analysis module operatively connected to the detection module and configured to: (1) obtain the data including the defects on the simulated manufactured wafer; (2) determine one or more problematic areas of the previously manufactured photomask based on the data including the defects on the simulated manufactured wafer; and (3) generate pattern information relating to the problematic areas of the previously manufactured photomask; (f) a spatial domain analysis module operatively connected to the photomask analysis module and configured to: (1) obtain the pattern information relating to the problem areas of the previously manufactured photomask; (2) conduct a spatial domain analysis of the pattern information; and (3) output a result of the spatial domain analysis; (g) a pattern identification module operatively connected to the spatial domain analysis module and configured to: (1) obtain the result of the spatial domain analysis; (2) determine, based on the result of spatial domain analysis, a plurality of photomask structure patterns that exhibit one or more corresponding defects; (3) output data corresponding to the plurality of photomask structure patterns that exhibit one or more corresponding defects; (h) a pattern generating module operatively connected to the pattern identification module and configured to: (1) obtain the data corresponding to the plurality of photomask structure patterns that exhibit one or more corresponding defects; (2) select a plurality of treatments to be applied to the plurality of photomask structure patterns that exhibit one or more corresponding defects; and (3) for each selected treatment, select a plurality of parameters corresponding to the treatment; (4) apply the selected treatments with the selected parameters to the plurality of photomask structure patterns that exhibit one or more corresponding defects; (5) generate the plurality of potential corrective photomask structure patterns from the plurality of photomask structure patterns based on the spatial domain analysis; (6) incorporate the potential corrective photomask structure patterns into a test photomask; (7) analyze the potential corrective photomask structure patterns on the test photomask; (8) select and output plurality of corrective photomask structure patterns from the plurality of potential corrective photomask structure pattern; and (i) a script module operatively connected to the pattern selection module and configured to: (1) obtain the plurality of corrective photomask structure patterns; (2) generate one or more photomask pattern correction scripts based on the plurality of corrective photomask structure patterns; and (3) execute the one or more photomask pattern correction scripts to apply one or more of the plurality of corrective photomask structure patterns to a photomask layout.

In embodiments, the pattern information comprises one or more data files corresponding to a layout of a previously manufactured photomask.

In embodiments, the spatial domain analysis comprises: (i) conducting a pattern descriptive search of the pattern information; (ii) identifying photomask structures from the pattern information based on the pattern descriptive search; and (iii) generating a graph corresponding to the identified photomask structures. In embodiments, the plurality of photomask structure patterns that exhibit one or more corresponding defects are identified based on the graph corresponding to the identified photomask structures.

In embodiments, analyzing the corrective photomask structure patterns on the test photomask comprises: (i) executing a manufacturing simulation process based on the test photomask; and (ii) visually inspecting a result of the manufacturing simulation process.

In embodiments, the potential corrective photomask structure patterns are incorporated into unused space on a previously manufactured photomask.

In embodiments, a mask design correction system, comprising one or more computer systems each including one or more processors operatively connected to one or more memory devices and a plurality of modules stored in the one or more memory devices and programmed to run on one or more of the one or more processors, the plurality of modules comprising: (a) a scanning module configured to: (1) scan a first scanning electron microscope (SEM) image of a layer in a wafer; (2) detect wafer defects from the first SEM image of a wafer; and (3) output locations on the wafer having the wafer defects; (b) a contour extraction module operatively connected to the scanning module and configured to: (1) obtain the locations on the wafer having wafer defects; and (2) extract a plurality of mask contours from a second SEM image of a previously manufactured photomask associated with the layer in the wafer, wherein the extracted mask contours correspond to location on the previously manufactured photomask that correspond to the detected wafer defects of the wafer; (c) a simulation module operatively connected to the contour extraction module and configured to: (1) obtain the plurality of extracted mask contours; and (2) generate a simulated manufactured wafer using the extracted plurality of mask contours; (d) a detection module operatively connected to the simulation module and configured to: (1) obtain the simulated manufactured wafer; (2) detect one or more defects on the simulated manufactured wafer; (3) output data including the defects on the simulated manufactured wafer; (e) a photomask analysis module operatively connected to the detection module and configured to: (1) obtain the data including the defects on the simulated manufactured wafer; (2) determine one or more problematic areas of the previously manufactured photomask based on the data including the defects on the simulated manufactured wafer; and (3) generate pattern information relating to the problematic areas of the previously manufactured photomask; (f) a spatial domain analysis module operatively connected to the photomask analysis module and configured to: (1) obtain the pattern information relating to the problem areas of the previously manufactured photomask; (2) conduct a spatial domain analysis of the pattern information; and (3) output a result of the spatial domain analysis; (g) a pattern identification module operatively connected to the spatial domain analysis module and configured to: (1) obtain the result of the spatial domain analysis; (2) determine, based on the result of spatial domain analysis, a plurality of photomask structure patterns that exhibit one or more corresponding defects; (3) output data corresponding to the plurality of photomask structure patterns that exhibit one or more corresponding defects; (h) a pattern generation module operatively connected to the pattern identification module and configured to: (1) obtain the data corresponding to the plurality of photomask structure patterns that exhibit one or more corresponding defects; (2) select a plurality of treatments to be applied to the plurality of photomask structure patterns that exhibit one or more corresponding defects; and (3) for each selected treatment, select a plurality of parameters corresponding to the treatment; and (4) apply the selected treatments with the selected parameters to the plurality of photomask structure patterns that exhibit one or more corresponding defects; (5) generate the plurality of corrective photomask structure patterns from the plurality of photomask structure patterns based on the spatial domain analysis; and (i) a script module operatively connected to the pattern generation module and configured to (1) obtain the plurality of corrective photomask structure patterns; (2) generate one or more photomask pattern correction scripts based on the plurality of corrective photomask structure patterns; and (3) execute the one or more photomask pattern correction scripts to apply one or more of the plurality of corrective photomask structure patterns to a photomask layout.

In embodiments, the pattern information comprises one or more data files corresponding to a layout of a previously manufactured photomask.

In embodiments, the spatial domain analysis comprises: (i) conducting a pattern descriptive search of the pattern information; (ii) identifying photomask structures from the pattern information based on the pattern descriptive search;

and (iii) generating a graph corresponding to the identified photomask structures. In embodiments, the plurality of photomask structure patterns that exhibit one or more corresponding defects are identified based on the graph corresponding to the identified photomask structures.

In embodiments, the corrective photomask structure patterns are incorporated into unused space on a previously manufactured photomask.

DESCRIPTION OF THE DRAWINGS

Exemplary embodiments of the present invention will be described with references to the accompanying figures, wherein:

FIG. 5 depicts an example of an output log file of a SEM image to contour extraction tool, in accordance with exemplary embodiments of the present invention;

FIG. 6 depicts sample options used in running a SEM image to contour extraction tool, in accordance with exemplary embodiments of the present invention;

FIG. 13 depicts a table of dose modulations to be applied to different photomask structures at different times to create a set of potential corrective photomask structures, in accordance with exemplary embodiments of the present invention;

FIG. 18 depicts a table containing rules for applying corrective treatments to one or more photomask structures, in accordance with exemplary embodiments of the present invention;

FIG. 19 depicts a comparison between SEM images of different photomasks, one having received no treatment, and the other having been treated with the corrective photomask structures, in accordance with exemplary embodiments of the present invention;

FIG. 21 depicts a comparison between SEM images of different photomasks, one having received no treatment, and the other having been treated with the corrective photomask structures, in accordance with exemplary embodiments of the present invention.

DETAILED DESCRIPTION

The present invention generally relates to systems and methods for creating masks that address the issues in manufacturing integrated circuits on wafers using EUV and optical lithography.

In embodiments, LAMA characterization methodology using contour extraction can be used to characterize the process improvements and predict wafer performance. Mask process improvements that are required include both physical mask process components as well as write data optimization techniques, i.e. mask process correction (MPC).

Mask pattern fidelity in EUVL is especially important. In embodiments, a methodology for mask and wafer process co-development using LAMA methodology demonstrate as shown in FIG. 19 the mask fidelity improvement on 1D structure With Contact Holes, the issues are 2D in nature. This phenomenon results in high local CD uniformity (LCDU) error on the photomask which results in LCDU error on wafer. This can be somewhat mitigated by LAMA treatment techniques as shown in FIG. 21.

Figure 1:
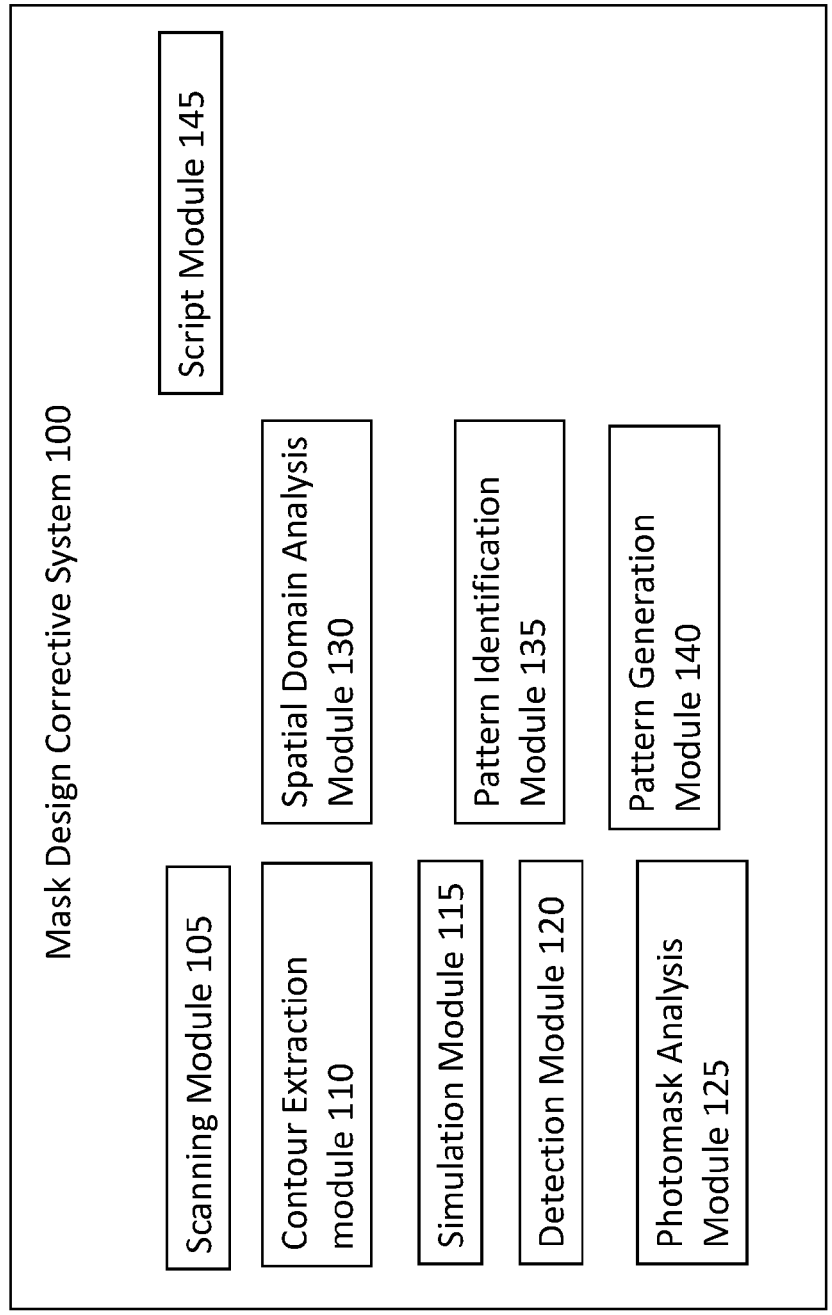
FIG. 1 depicts a mask design corrective system, according to embodiments of the present invention.

FIG. 1 depicts a block diagram of a mask design corrective system, according to embodiments. Mask design corrective system 100 can be implemented using, for example, one or more desktop computers, server-grade computers, laptops, tablets, and smartphones, to name a few (hereinafter referred to as a mask design correction system). The one or more computing devices can be coupled in a wired or wireless local area network, a wide area network, the Internet, or via a cloud computing platform, to name a few.

As shown in the figure, mask design corrective system 100 includes scanning module 105. In embodiments, scanning module 105 is configured to scan a first scanning electron microscope (SEM) image of a layer in a wafer, detect wafer defects from the first SEM image of a wafer, and output locations on the wafer having the wafer defects Contour extraction module 110 is configured to obtain the locations on the wafer having wafer defects and extract a plurality of mask contours from a second SEM image of a previously manufactured photomask associated with the layer in the wafer, where the extracted mask contours correspond to location on the previously manufactured photomask that correspond to the detected wafer defects of the wafer. Simulation module 115 is configured to obtain the plurality of extracted mask contours and generate a simulated manufactured wafer using the extracted plurality of mask contours. Detection module 120 is configured to obtain the simulated manufactured wafer, detect one or more defects on the simulated manufactured wafer, and output data including the defects on the simulated manufactured wafer. Photomask analysis module 125 is configured to obtain the data including the defects on the simulated manufactured wafer, determine one or more problematic areas of the previously manufactured photomask based on the data including the defects on the simulated manufactured wafer, and generate pattern information relating to the problematic areas of the previously manufactured photomask. Spatial domain analysis module 130 is configured to obtain the pattern information relating to the problem areas of the previously manufactured photomask, conduct a spatial domain analysis of the pattern information, and output a result of the spatial domain analysis. Pattern identification module 135 is configured to obtain the result of the spatial domain analysis, determine, based on the result of the spatial domain analysis, a plurality of photomask structure patterns that exhibit one or more corresponding defects, and output data corresponding to the plurality of photomask structure patterns that exhibit one or more corresponding defects. Pattern generating module 140 is configured to obtain the data corresponding to the plurality of photomask structure patterns that exhibit one or more corresponding defects, select a plurality of treatments to be applied to the plurality of photomask structure patterns that exhibit one or more corresponding defects, for each selected treatment, select a plurality of parameters corresponding to the treatment, apply the selected treatments with the selected parameters to the plurality of photomask structure patterns that exhibit one or more corresponding defects, generate the plurality of potential corrective photomask structure patterns from the plurality of photomask structure patterns based on the spatial domain analysis, incorporate the potential corrective photomask structure patterns into a test photomask, analyze the potential corrective photomask structure patterns on the test photomask and select and output plurality of corrective photomask structure patterns from the plurality of potential corrective photomask structure pattern. Script module 145 is configured to obtain the plurality of corrective photomask structure patterns, generate one or more photomask pattern correction scripts based on the plurality of corrective photomask structure patterns, and execute the one or more photomask pattern correction scripts to apply one or more of the plurality of corrective photomask structure patterns to a photomask layout.

Figure 2:
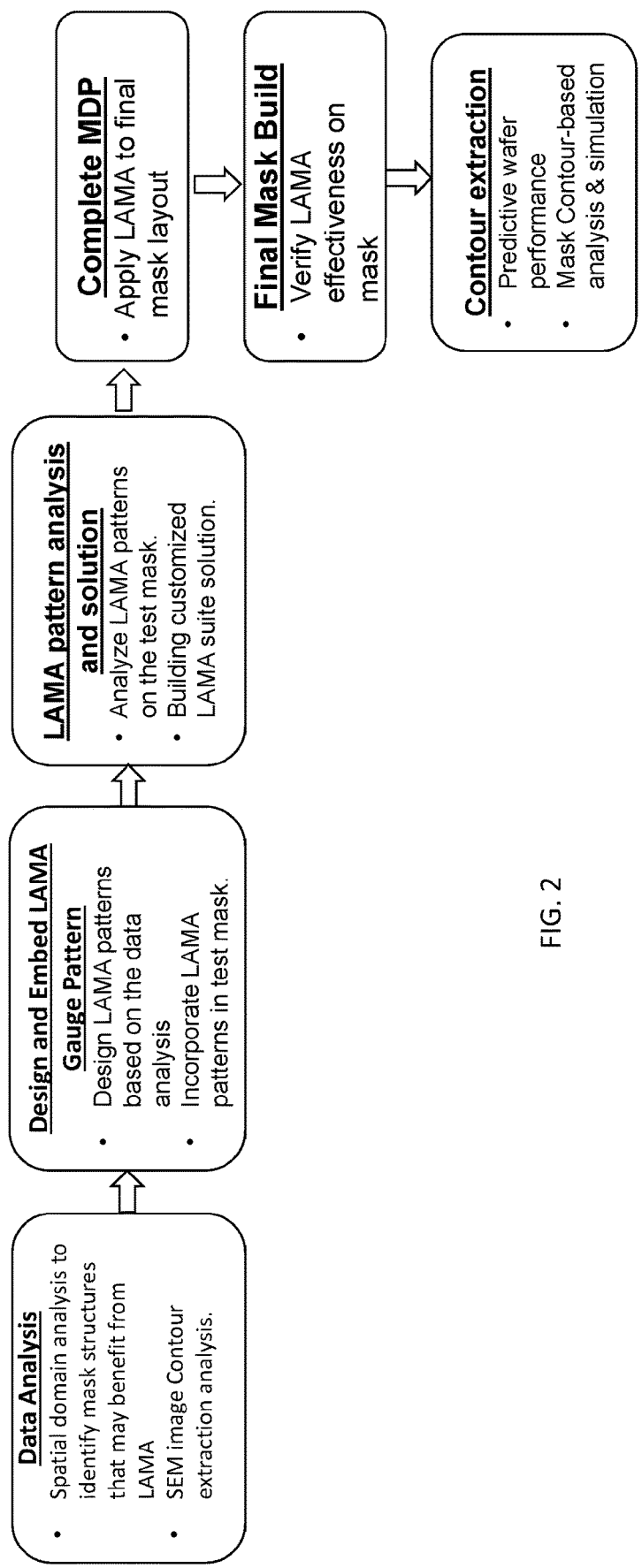
FIG. 2 depicts a flow diagram of a process flow for creating a photomask in accordance with exemplary embodiments of the present invention.

FIG. 2 is a flow diagram of a process flow in accordance with exemplary embodiments of the present invention. The depicted process flow shows steps carried out by embodiments of a mask design corrective system, such as the system 100 depicted in FIG. 1. The process flow includes a data analysis step, in which a spatial domain analysis is performed to identify mask structures needing correction. In addition, SEM image contour analysis may be performed. A design and embed LAM gauge pattern step designs LAMA patterns based on the data analysis and incorporates the patterns into a test mask. A LAMA pattern analysis and solution step analyzes the LAMA patterns on the test mask and builds a customized LAMA solution. Next, LAMA patterns are applied to a mask layout and a final mask is built and verified. Finally, contour extraction is performed to evaluate predictive wafer performance of the final mask.

Figure 3A:
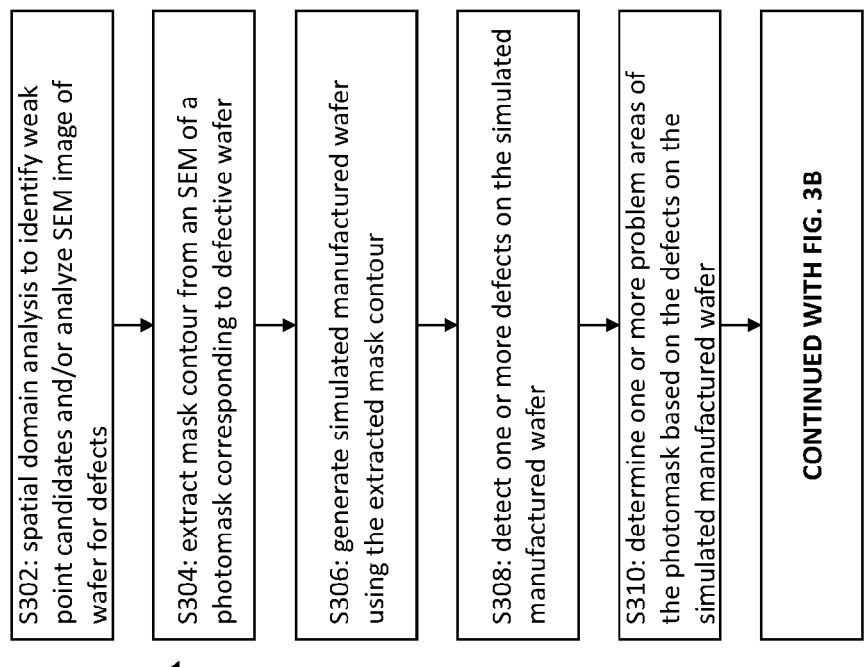
FIGS. 3A-3C illustrate a flow diagram of a process for creating a photomask in accordance with exemplary embodiments of the present invention.
Figure 3B:
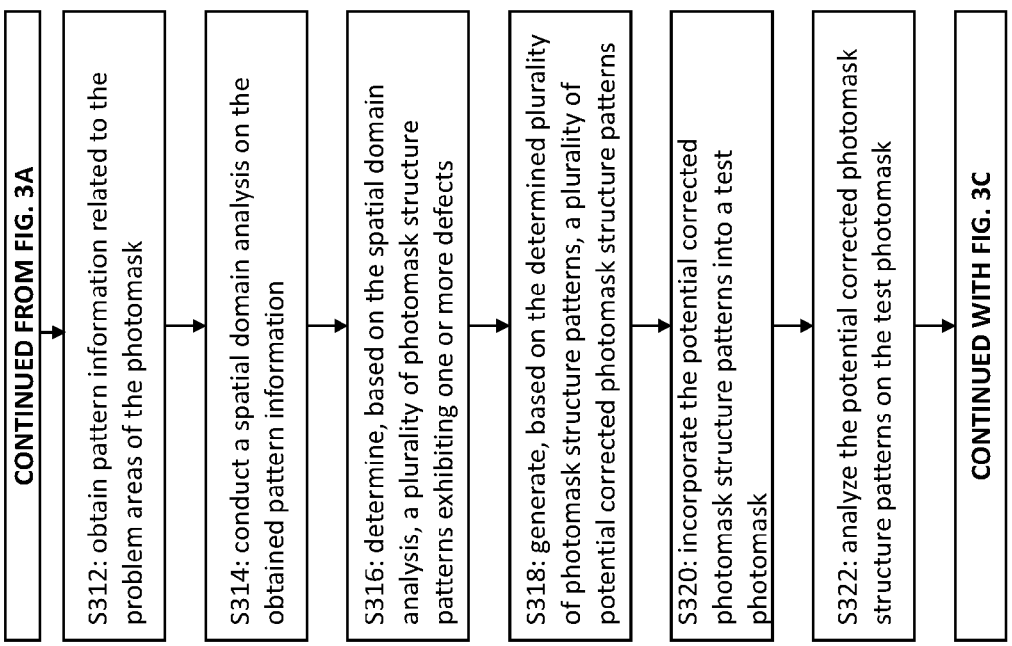
Figure 3C:
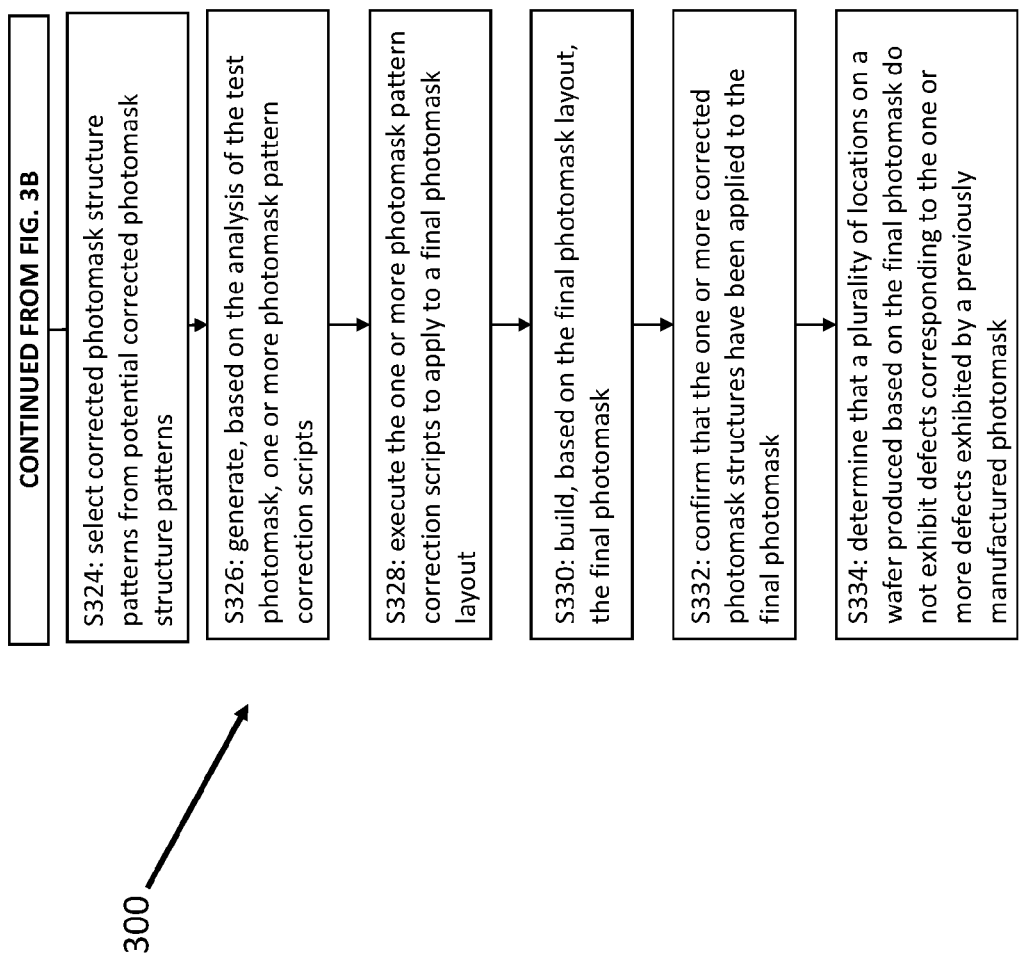

FIGS. 3A-3C illustrate a process flow of a method 300 according to an exemplary embodiment of the present invention. In embodiments, the illustrated process flow can be carried out by one or more computing devices such as, for example, one or more desktop computers, server-grade computers, laptops, tablets, and smartphones, to name a few (hereinafter referred to as a mask design correction system). The one or more computing devices can be coupled in a wired or wireless local area network, a wide area network, the Internet, or via a cloud computing platform, to name a few. In embodiments, the network will be a secure network.

Method 300 begins at step S302. At step S302, in embodiments, spatial domain analysis is used to identify weak point candidates and/or SEM image of a layer in wafer analyzed by a mask design correction system carrying out the method. The mask design correction system analyzes the SEM image of wafers for defects, such as, for example, line breaks and micro bridges, to name few. Other defects may also be present that could be addressed without departing from the scope or spirit of the present invention. In embodiments, the identified defects can be used to identify corresponding areas in the photomask design to be analyzed and/or corrected. In embodiments, step S302 may be replaced by other processes which can identify potential hot spots or weak points or errors in a layer of a wafer.

At step S304, in embodiments, the mask design correction system extracts a mask contour of a SEM image of a photomask, where the photomask is the corresponding photomask used to manufacture the wafer. In embodiments, where an SEM image of a wafer is used in step S302, the photomask corresponds to the layer in the wafer associated with the SEM image of the wafer. In embodiments where other processes are used to identify hot spots in a layer of a wafer, the photomask corresponds to the layer in the wafer associated with the identified hot spot(s). According to embodiments, a mask contour is extracted based on the areas identified in the SEM image which exhibited defects. In embodiments, the extraction may be performed based on a SEM image of the photomask, and/or design data for the photomask, to name a few.

Next, at step S306, the mask design correction system runs a manufacturing simulation process, using the extracted mask contour as an input. The simulation generates a simulated manufactured wafer, which can then be analyzed for defects similar to the ones detected on the physical wafer in step S302, or other identified actual and/or potential hot spots.

At step S308, the mask design correction system detects one or more defects on the simulated manufactured wafer. The mask design correction system can detect defects or weak point candidates by utilizing visual inspection tools, optical inspection tool, critical dimension measurement tools, to name a few.

At step S310, the mask design correction system determines one or more problematic areas of the photomask based on the defects detected using LAMA mask and wafer harmonization simulation. In embodiments, the location of one or more problematic areas will be identified for further analysis and correction in the mask design for the respective layer.

Method 300 then proceeds to step S312. At step S312, pattern information relating to the one or more problematic areas of the photomask identified in step S310 is obtained by the mask design correction system. In embodiments, the pattern information can be in the form of one or more data files that describe the layout of the previously manufactured photomask that exhibit the identified defects. In embodiments, the pattern information can be a design of a photomask that is yet to be manufactured, but has otherwise been identified as containing design elements that are expected to exhibit defects if not corrected.

Figure 4:
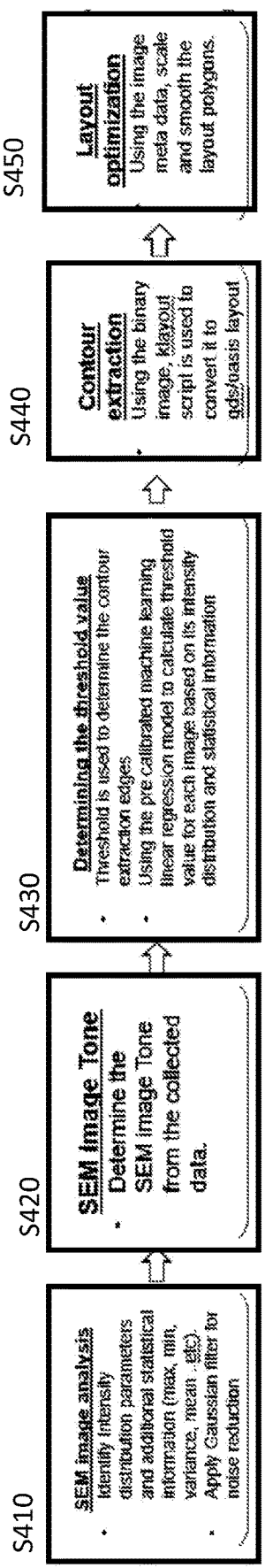
FIG. 4 depicts an exemplary algorithm executed by a SEM image to contour extraction tool, in accordance with exemplary embodiments of the present invention.
Figure 7:
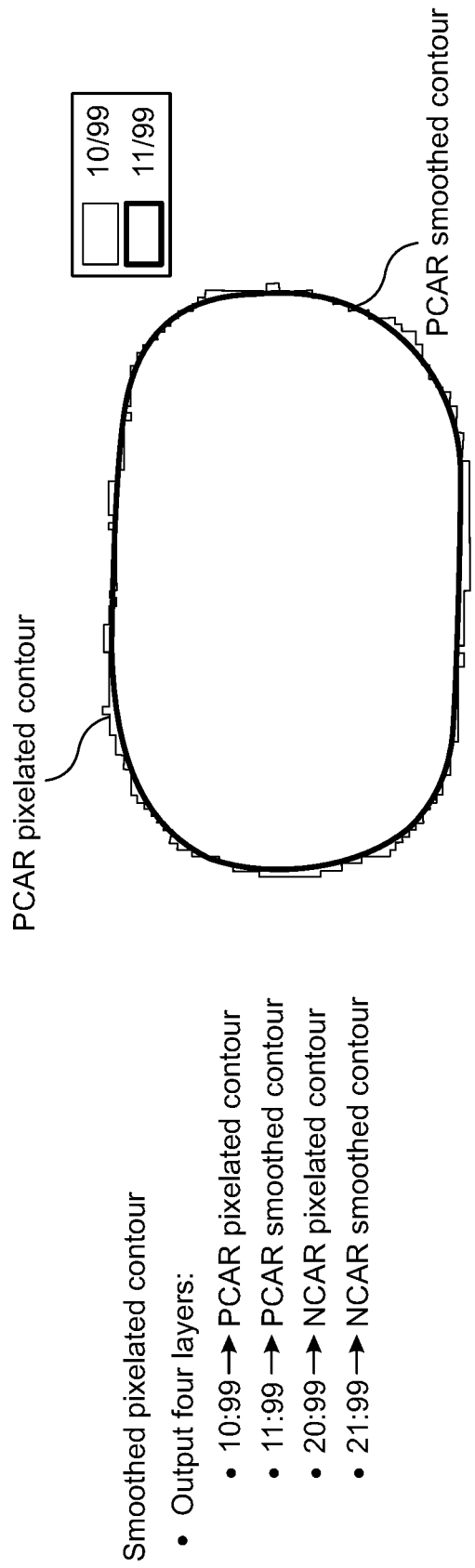
FIG. 7 depicts a smoothed pixelated contour produced by a SEM image to contour extraction tool, in accordance with exemplary embodiments of the present invention.

In embodiments, the pattern information can be obtained using a scanning electron microscope (SEM) contour extraction analysis of an already-existing photomask. This can be achieved using a SEM image to contour extraction tool that executes a contour extraction algorithm, such as LAMA contour extraction tool algorithm depicted in FIG. 4. In embodiments, other contour extraction algorithms can be used without departing from the scope or spirit of the present invention. An example of an output log file of the LAMA SEM image to contour extraction tool is illustrated in FIG. 5. Sample options used in running the LAMA SEM image to contour extraction tool are shown in FIG. 6, where the tool is invoked from a command line interface of a computing device. As shown, the options that can be specified include pixel selection tolerance, smooth value use, tone, the size of an ignore area, background area size, and scale in the X and Y directions, to name a few. In embodiments, other variations on processing steps or material selections in the manufacture of the wafer may be used without departing from the scope or spirit of the invention. In embodiments, the SEM image to contour extraction tool may produce a smoothed pixelated contour as shown in FIG. 7.

Figure 8:
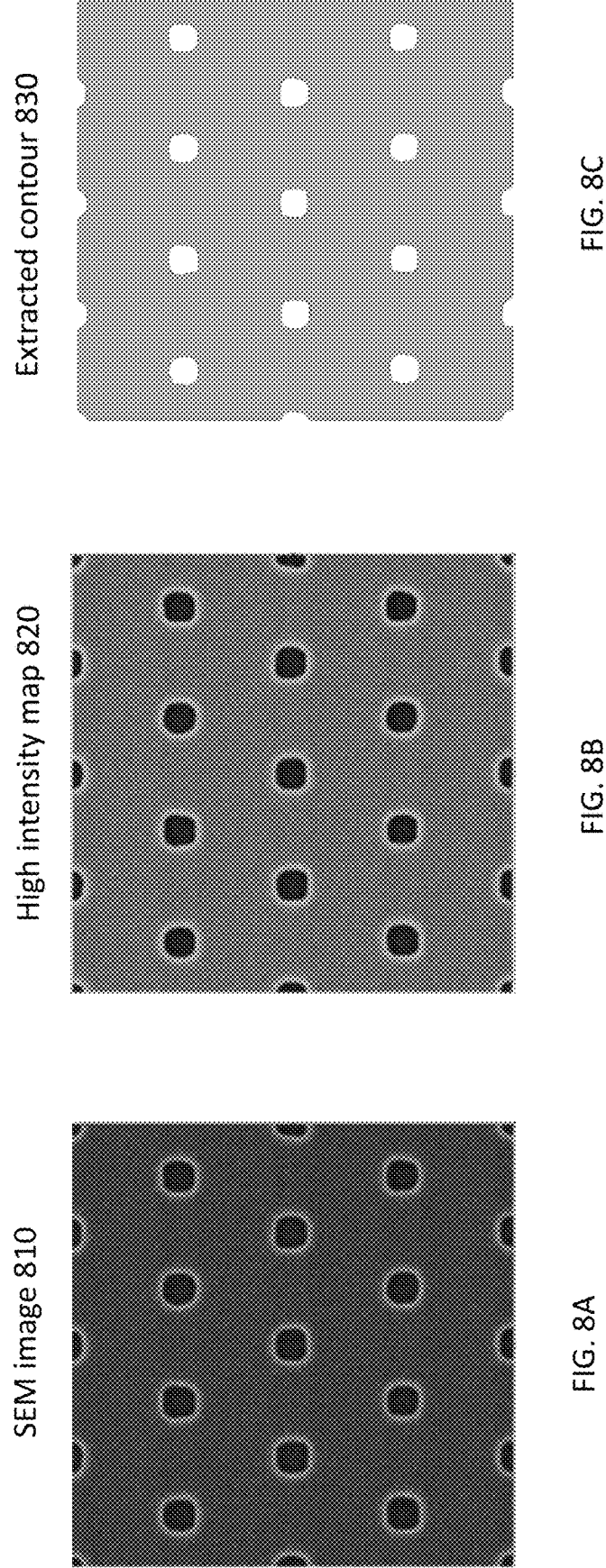
FIGS. 8A, 8B, and 8C depict a process for obtaining pattern information from a SEM image, in accordance with exemplary embodiments of the present invention.

FIGS. 8A, 8B, and 8C depict a process for obtaining pattern information from a SEM image. As shown in the figure, FIG. 8A shows a SEM image of a mask contour. The mask contour represents at least a portion of the mask design associated with a problematic area of the mask, or "hot spot" or "weakpoint", as determined in step S310. FIG. 8B shows a high intensity map that was extracted from the image in FIG. 8A by the SEM image to contour extraction associated with at least a portion of the mask design associated with the problematic areas of the mask. The high intensity map enables mask design correction system to identify specific areas of the mask that are likely to benefit from correction. After these areas are identified, mask design correction system creates a mask design file (e.g., the OASIS/GDS shown in FIG. 8C) or any layout format file. Open Artwork System Interchange Standard (OASIS) is a specification for hierarchical integrated circuit mask layout data format for interchange between EDA (Electronic Design Automation) software, IC mask writing tools and mask inspection tools. The OASIS file stores the mask layout information (which includes mask pattern information) for subsequent analysis. Other layout data formats may be used without departing from the scope or spirit of the present invention.

Figure 9:
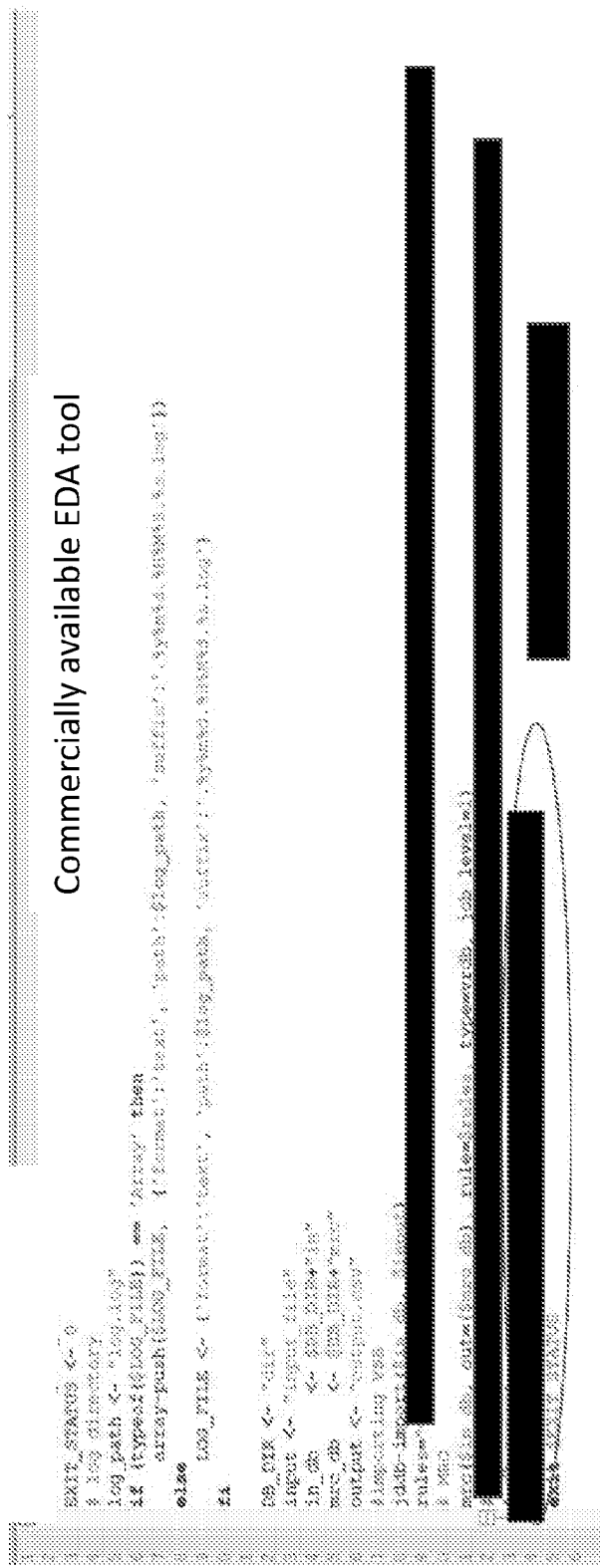
FIG. 9 depicts an example of pattern searching computer code, in accordance with exemplary embodiments of the present invention.

Once the pattern information is obtained in step S312, method 300 proceeds to step S314. In step S314 of method 300, the mask design correction system may conduct a spatial domain analysis on the obtained pattern information. According to embodiments, the spatial domain analysis is conducted by executing a pattern descriptive search, which extracts patterns from the pattern information using big data analytics. Sample data analysis tools can be used to perform the pattern searching using available commercial EDA tools. In embodiments, the pattern searching can be referred to as Design Rule Check (DRC), Mask Rule Check (MRC), or Pattern Matching (PM), to name a few. An example of commercially available EDA tool pattern searching code is depicted in FIG. 9. Other pattern searching codes may be used without departing from the scope or spirit of the present invention. Input to the pattern descriptive search software may include the pattern information such as, for example, the incoming device semiconductor data. Other input data may be used in conjunction with the pattern information without departing from the scope or spirit of the present invention.

Figure 10:
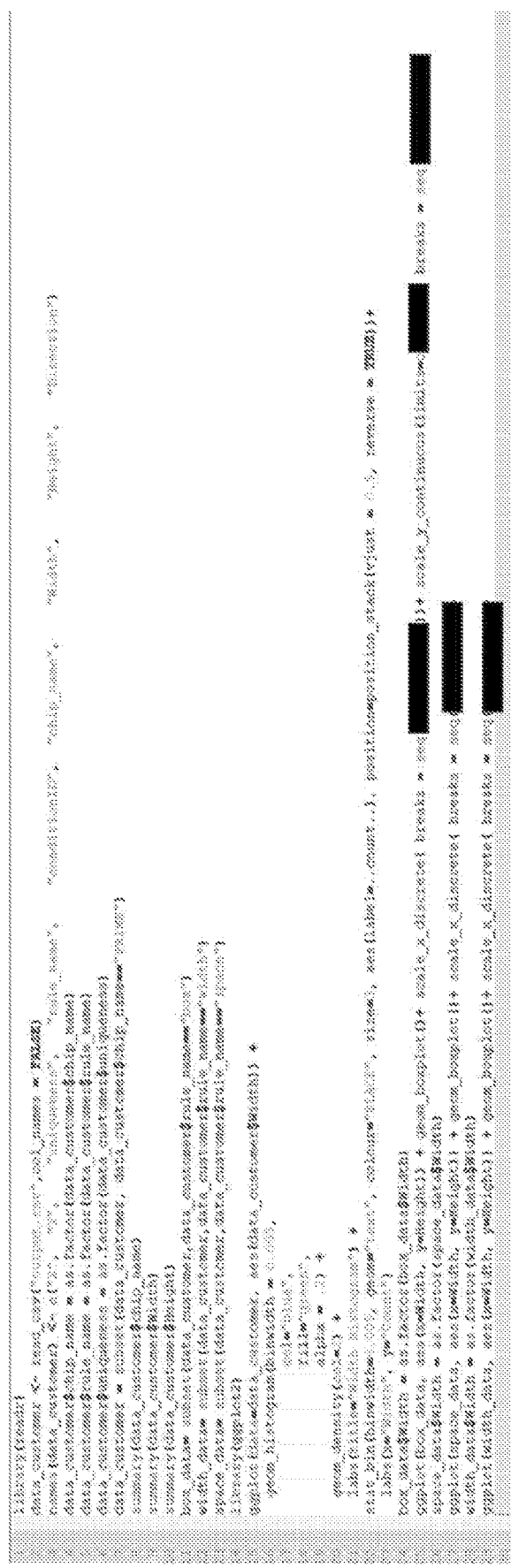
FIG. 10 depicts exemplary data analysis computer code, in accordance with exemplary embodiments of the present invention.

Once the pattern descriptive search is performed, in embodiments, the extracted patterns may then be analyzed by the mask design correction system using, e.g., data analysis code. An example of data analysis code is shown in FIG. 10. In embodiments, the data analysis code outputs results that illustrate photomask areas/structures that could benefit from LAMA.

These and other analyses techniques may be used without departing from the scope or spirit of the present invention.

Referring to FIG. 3, after conducting the spatial domain analysis at step S314, method 300 proceeds to step S316. At step S316, in embodiments, the mask design correction system determines, based on, e.g., the spatial domain analysis of the pattern information, one or more photomask structure patterns that exhibit one or more weak point candidates, such that the structures can benefit from application of LAMA. Example weak point candidates and/or treatments may include corner rounding, horizontal and vertical biases, and dose modulation, to name a few. Other weak point candidates and/or treatments may be appropriate for LAMA correction without departing from the scope or spirit of the present invention.

Figure 11:
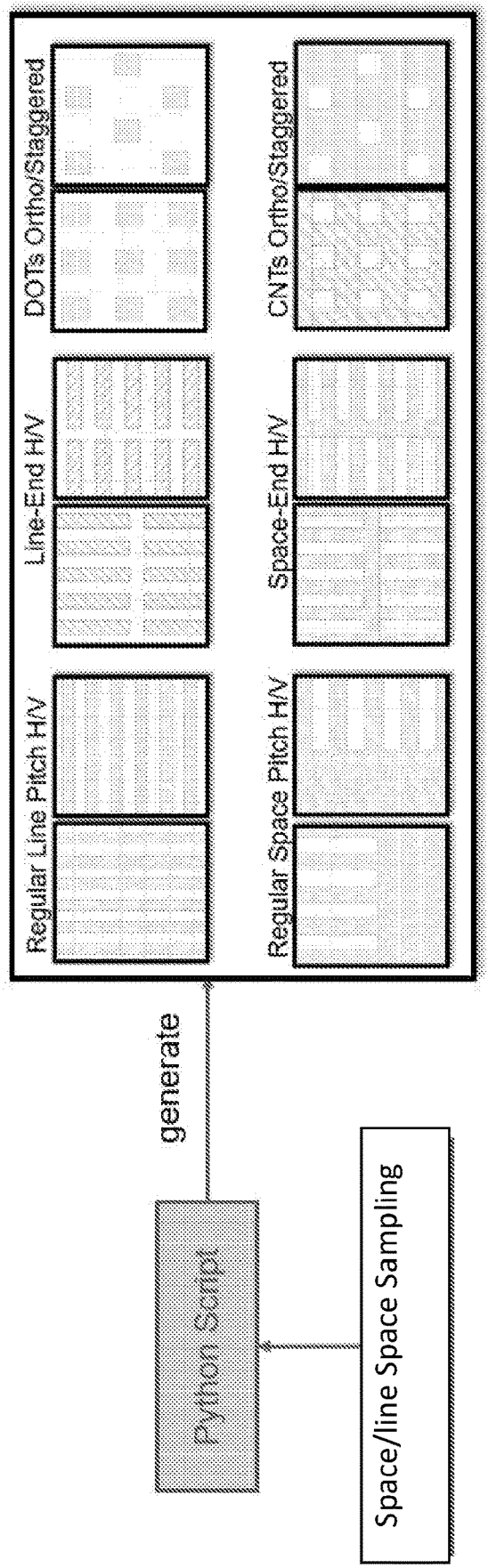
FIG. 11 depicts an exemplary process that generates one or more photomask structure patterns that exhibit one or more defects, in accordance with exemplary embodiments of the present invention.

In embodiments, mask design correction system generates one or more photomask structure patterns that exhibit one or more weak point candidate based on, e.g., space/line space sampling conducted for customer future products. Other weak point candidate may also be generated without departing from the scope or spirit of the present invention. As shown in FIG. 11, the space/line space sampling data is input to a python script, which generates various patterns based on the data. As shown in FIG. 11, patterns generated can include regular line pitch horizontal/vertical, line-end horizontal/vertical, DOTs orthogonal/staggered, regular space pitch horizontal/vertical, space-end horizontal/vertical, and CNTs orthogonal/staggered as well as structures typical integrated in logic and memory designs, to name a few.

After the one or more photomask structure patterns that exhibit the one or more defects are identified, method 300 proceeds to step S318. At step S318, in embodiments, the mask design correction system generates, based on the photomask structure patterns identified in step S316, one or more of potential corrective photomask structure patterns. In embodiments, the potential corrective photomask structures are generated for one or more layers of the photomask corresponding to the pattern information obtained at step S312. In embodiments, step S318 entails designing and generating a litho aware mask process correction application (LAMA) gauge based on the data analysis. The LAMA gauge comprises the potential corrective structures to be used in building a test photomask. The inputs to step S318 include both manufacturing knowhow, data from the wafer manufacturer, and data extracted from the data analysis. For example, manufacturing knowhow can include limitations of the manufacturing process in which the photomask is to be used. Manufacturing data can include minimum space and width parameters, corner to corner measurements, and/or mask process fidelity characterization (such as corner rounding, corner pullback, and pitch), to name a few. The results of the data analysis that are used in generating the corrected photomask structure patterns may include customer design spatial domain data, anchor/critical structures, and/or a range of critical dimensions and design shapes to be focused on in the LAMA gauge, to name a few.

In embodiments, the mask design correction system selects a plurality of treatments to be applied to the plurality of photomask structure patterns that exhibit one or more corresponding defects. For each of the selected treatment, the mask design correction system selects a plurality of parameters corresponding to that treatment. After selecting the treatments and the parameters corresponding to the treatments, mask design correction system applies the selected treatments with the selected parameters to the plurality of photomask structure patterns that exhibit one or more corresponding defects. In this way, the mask design correction system generates new photomask structure patterns based upon the pattern information. Different treatments are possible, including, for example, corner rounding and dose modulation. Mask design correction system applies multiple treatments to the defective photomask pattern structures to generate a plurality of photomask structure patterns that can potentially correct the defects.

In embodiments, where a test mask is to be used, a plurality of potential corrective structure may be identified and used on the test mask as described below. In embodiments, where a fully formed photomask for the layer may be used, a specific corrective structure may be selected and applied in the fully formed photomask design for the layer and then applied directly to generate a photomask. In embodiments, a combination of these techniques may be used, e.g., printing a fully formed photomask design for the layer in combination with one or more potential corrective structures in unused portions of the photomask.

In embodiments, the LAMA gauge can be designed to modulate the dose for smaller features and to perform corner rounding in order to enhance resolution. Further, non-treated patterns can be used for fidelity characterization and for defining photomask limits. Examples of LAMA gauge designs that can be used to generate potential corrected photomask structure patterns follow in FIGS. 12-17. Other LAMA gauges may be designed and/or applied without departing from the scope or spirit of the present invention.

Figure 12:
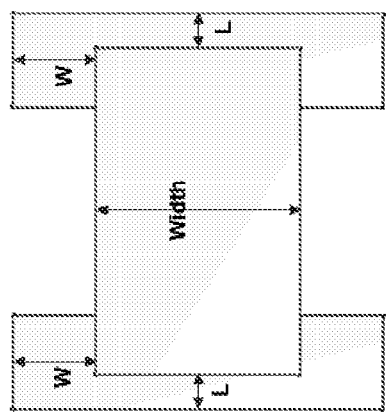
FIG. 12 depicts a table of corner rounding enhancements and horizontal/vertical biases to be applied to photomask structure patterns to create potential corrective photomask structure patterns, in accordance with exemplary embodiments of the present invention.
Figure 14:
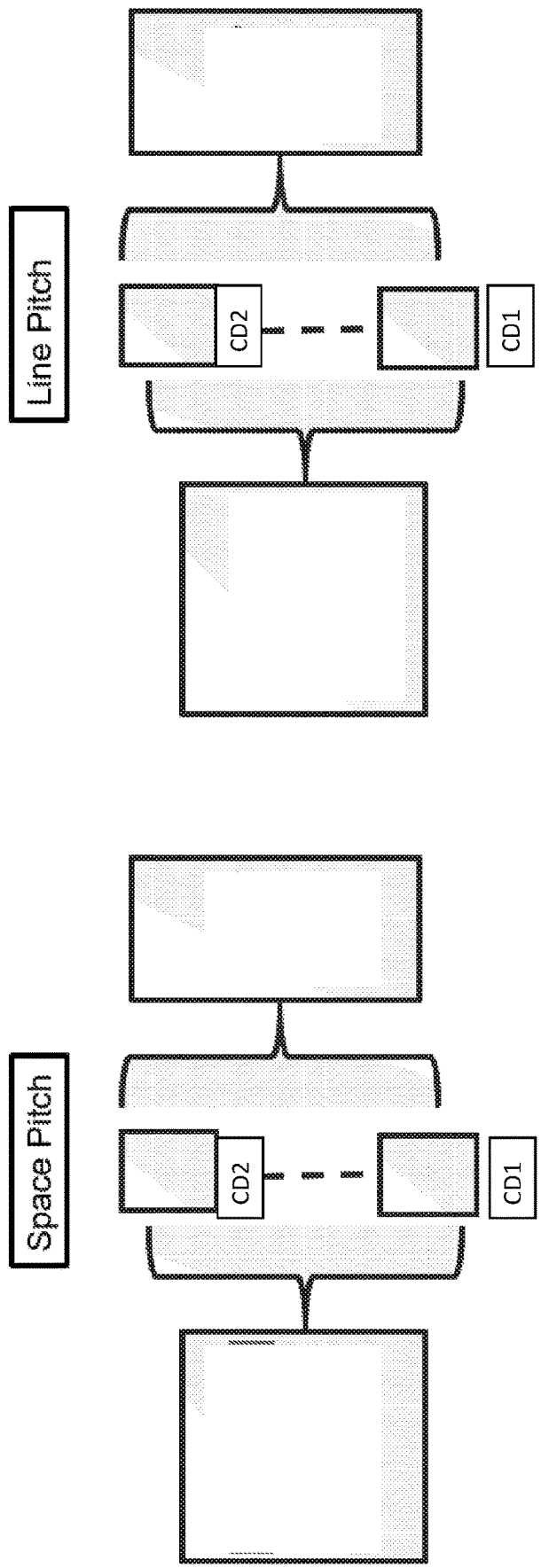
FIG. 14 depicts space pitch and line pitch designs to be applied to different photomask structures to create a set of potential corrective photomask structures, in accordance with exemplary embodiments of the present invention.
Figure 15:
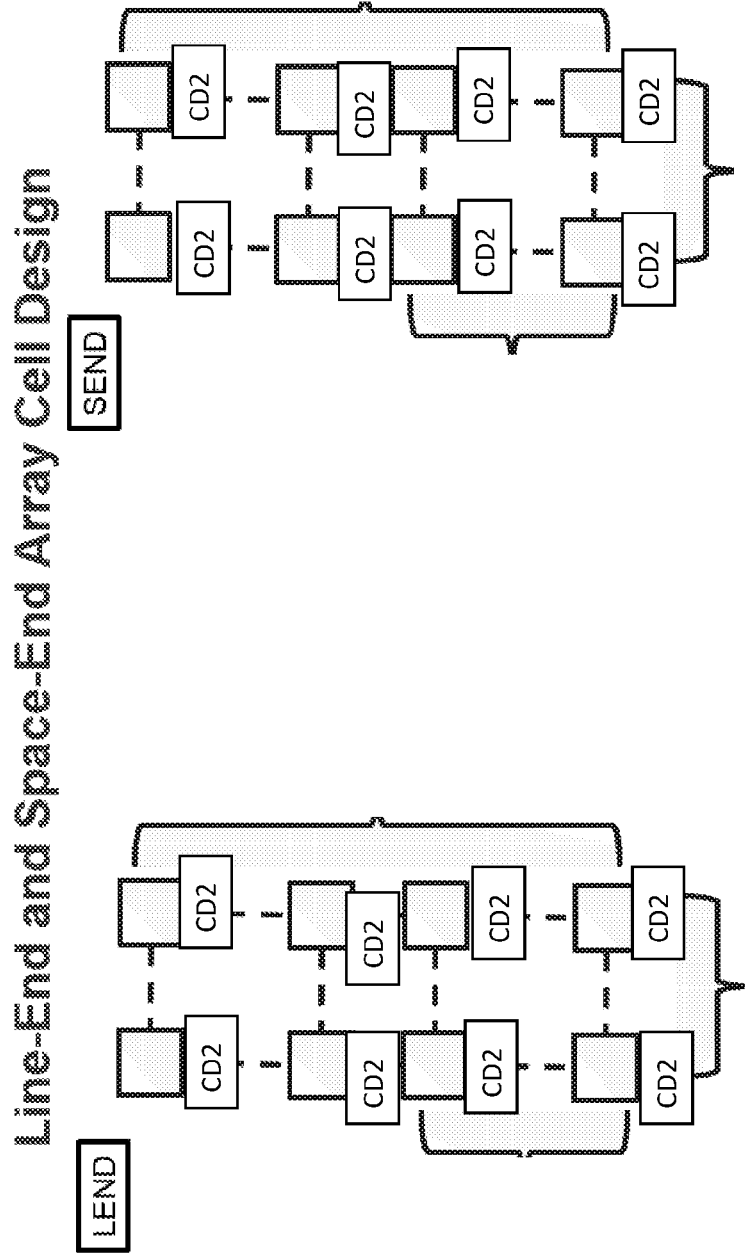
FIG. 15 depicts line-end and space-end designs to be applied to different photomask structures to create a set of potential corrective photomask structures, in accordance with exemplary embodiments of the present invention.
Figure 16:
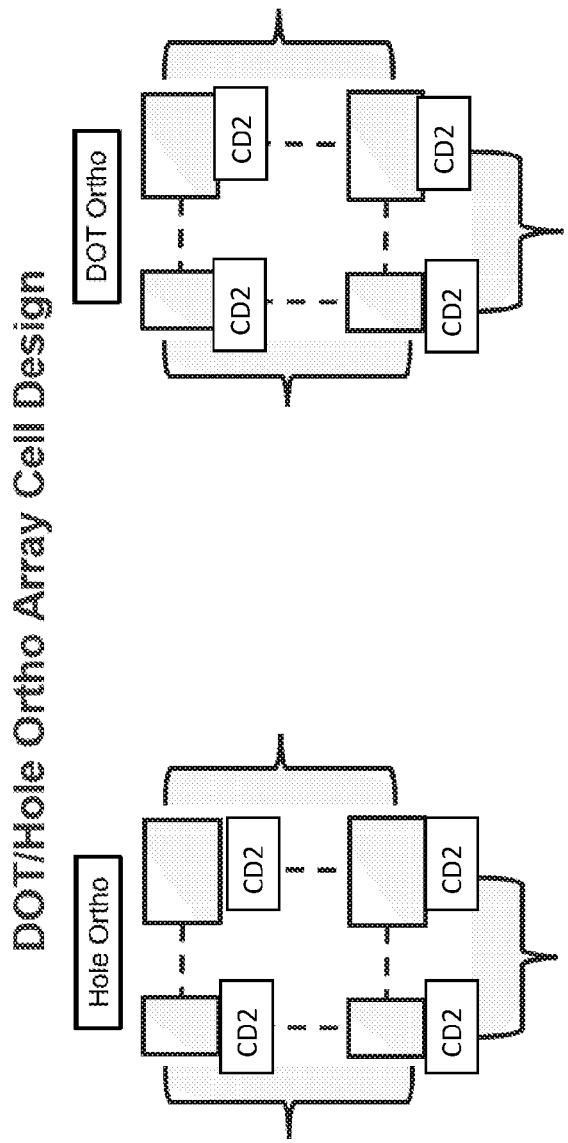
FIG. 16 depicts a DOT/hole orthogonal design to be applied to different photomask structures to create a set of potential corrective photomask structures, in accordance with exemplary embodiments of the present invention.
Figure 17:
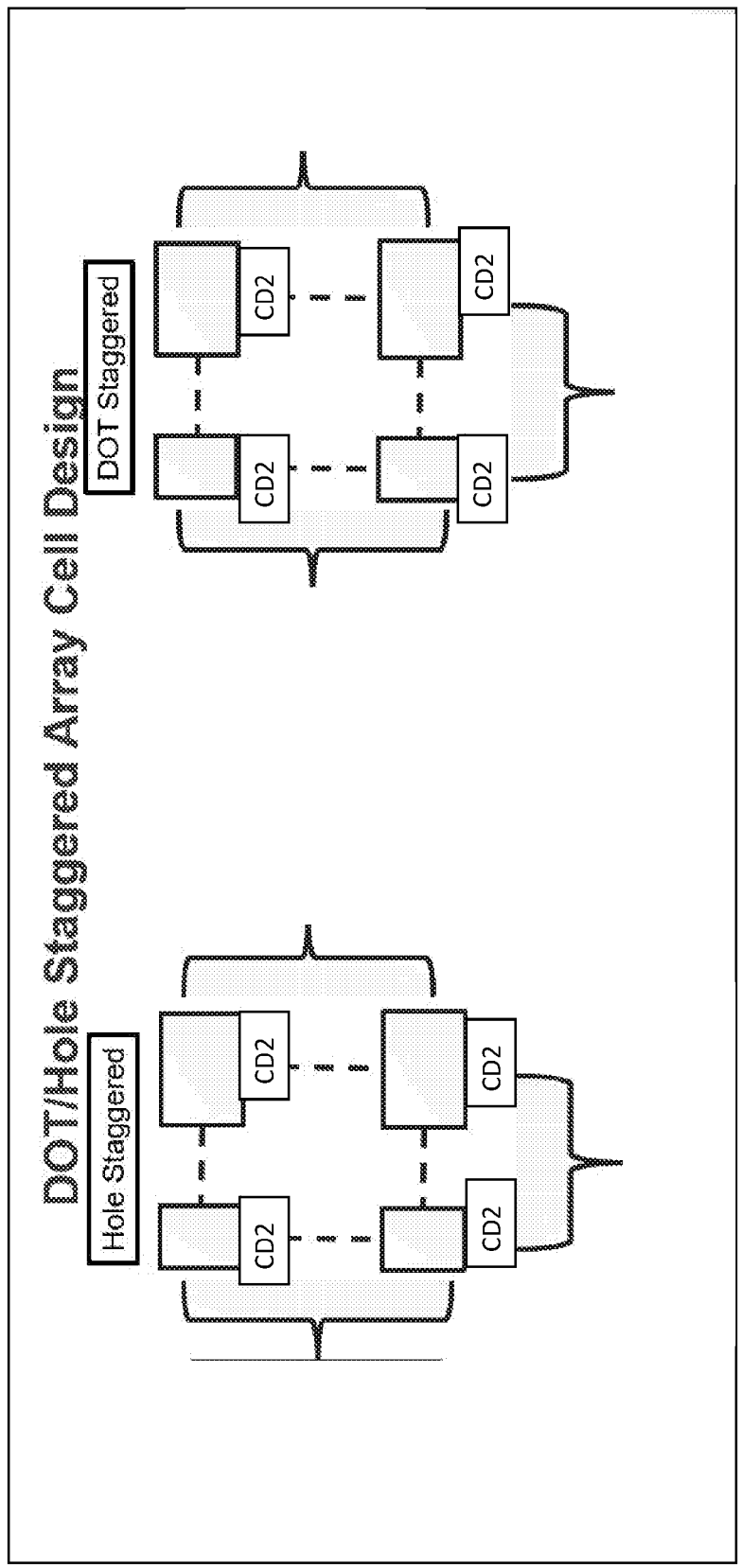
FIG. 17 depicts a DOT/hold staggered design to be applied to different photomask structures to create a set of potential corrective photomask structures, in accordance with exemplary embodiments of the present invention.

FIG. 12 depicts a table of corner rounding enhancements and horizontal/vertical biases to be applied to photomask structure patterns to create potential corrected photomask structure patterns. Similarly, FIG. 13 depicts a table of dose modulations to be applied to different photomask structures at different times to create a set of potential corrected photomask structures. FIG. 14 depicts space pitch and line pitch designs to be applied to different photomask structures to create a set of potential corrected photomask structures. FIG. 15 depicts line-end and space-end designs to be applied to different photomask structures to create a set of potential corrected photomask structures. FIG. 16 depicts a DOT/hole orthogonal design to be applied to different photomask structures to create a set of potential corrected photomask structures. FIG. 17 depicts a DOT/hole staggered design to be applied to different photomask structures to create a set of potential corrected photomask structures. These LAMA gauge designs represent examples of potential corrected photomask structures corresponding to the structures exhibiting one or more weak points identified in the pattern information. LAMA gauge pattern may be customized in size and exhibit flexibility and ease of placement into any unused space on photomask which in turn save additional mask costs. One or more of these LAMA gauge designs and/or other LAMA gauge designs may be used to form one or more potential corrected photomask structures without departing from the scope or spirit of the present invention.

Next, in step S320, the potential corrected photomask structure patterns are incorporated into a photomask design. According to embodiments, in this step, the mask design correction system carrying out method 300 reads the LAMA gauge designs that include the potential corrected photomask structures and applies those design elements to photomask data that defines how a photomask can be built. According to embodiments, the potential corrected photomask structures are incorporated into unused space on an already existing photomask layout.

At step S322, the mask design correction system analyzes the potential corrected photomask structure patterns on the test photomask. According to embodiments, the mask design correction system may perform simulations and/or visual inspections using SEM tool, CD tool or any other optical inspection tools on the photomask data that has incorporated therein the corrected photomask structures in order to determine whether the problematic areas exhibited in the pattern information have been corrected and/or rectified in an optimized and/or acceptable manner.

At step S324, the mask design correction system selects from the plurality of potential corrected photomask structure patterns, a subset that comprises a plurality of corrected photomask structure patterns. The selection of the corrected photomask structure patterns is based upon the analysis performed in step S322. In embodiments, the potential corrected photomask structures that exhibit the highest degree of correction of the identified defects are selected. In embodiments, a selected corrected photomask structure can be an interpolation between two potential corrected photomask structure patterns. That is, the interpolated corrected photomask structure pattern is a combination of adjacent patterns which is determined to be a more effective solution to the defects identified.

Next, at step S326, the mask design correction system generates one or more photomask pattern correction scripts based on the analysis of the test photomask. According to embodiments, the mask design correction system builds one or more tables containing rules for applying corrective treatments to one or more photomask structures. An example of such a table is depicted in FIG. 18. As shown, the table in FIG. 18 comprises a set of MRC rules (in this case corner rounding rules) to be applied to a test photomask. The table of FIG. 18 is based on the corrected photomask structure patterns incorporated into the test photomask and selected in step S324. The mask design correction system generates one or more photomask pattern correction scripts based on the rules set forth in the one or more tables. In embodiments, the scripts are generated in the NCS language. The scripts can also be generated in the Python programming language or any other EDA company scripting language. Other scripts or programming languages may be used without departing from the scope or spirit of the present invention.

Next, at step S328, the mask design correction system executes the one or more photomask pattern correction scripts to apply corrected photomask structures to a photomask layout that may be used to form the desired IC structure. Referring to FIG. 18, the corresponding script generated from the table would be executed to apply the listed rules to a photomask layout that may be used to generate a final photomask. Other scripts may be used without departing from the scope or spirit of the present invention.

In various exemplary embodiments, the corrected photomask structures can be laid out on the reticle plate in a suitable manner. For example, multiple corrective mask patterns can be formed on the plate, so that each layer of the semiconductor device can be formed using one or more of the corrective mask patterns. Further, it should be appreciated that the corrective mask patterns may be applied to a test mask that does not include or includes only some of the mask patterns intended for the final mask design, or may be applied to a final mask that incorporates the entirety of the layer patterns intended for use to form the IC product. Also, in exemplary embodiments, not all of the corrective mask patterns on the mask may be used during an IC manufacturing process, and in some cases only the corrective mask patterns that achieve the optimal correction are used even though other corrective patterns may be present on the mask.

At step S330, the final photomask incorporating a complete design for the layer is physically manufactured based on the final photomask layout for the full layer according to photomask manufacturing techniques known in the art.

In embodiments, a final mask design, including the full layer with selected corrective patterns incorporated, as well as corrective mask patterns associated with only a portion of the full layer may be printed to the same photomask. In such embodiment, a full layer may be delivered to the customer with potential corrections and potential corrective patterns to be tested for use in future versions of photomasks for that layer or with similar design elements. In such embodiments, the interim steps of manufacturing and analyzing a separate test mask may be skipped.

At step S332, the mask design correction system confirms that the one or more corrected photomask structure patterns have been applied to the final photomask. According to embodiments, the mask design correction system may utilize a critical dimension (CD) inspection tool to analyze, e.g., corner rounding, and horizontal/vertical biasing, to name a few, in the resulting final photomask. The mask design correction system uses the CD inspection tool to extract mask SEM contours or the SEM image to contour extraction tool and compares those contours to the final photomask layout design.

At step S334, the mask design correction system determines that a plurality of locations on a wafer produced based on the final photomask do not exhibit defects corresponding to the one or more defects exhibited on a previously manufactured photomask. In embodiments, multiple locations on the final photomask may be selected and compared to corresponding locations on a previously manufactured wafer that was produced using an untreated photomask. The treated and untreated photomask wafers are compared both visually and using analytical tools. For example, FIG. 21 depicts a comparison between an SEM image of an untreated photomask and an SEM image of photomask that was treated with a corrected LAMA pattern for a HOLE structure. As shown, in the treated photomask, there are no missing pattern and enhanced LCDU, more closely conforms to design specifications for the mask.

FIG. 19 depicts a comparison between SEM images of different photomasks, one having received no treatment, and the other having been treated with the corrected photomask structures selected in step S324. As shown, in the treated photomask, there are no line breaks, and line width and spacing more closely conforms to design specifications for the mask.

Figure 20:
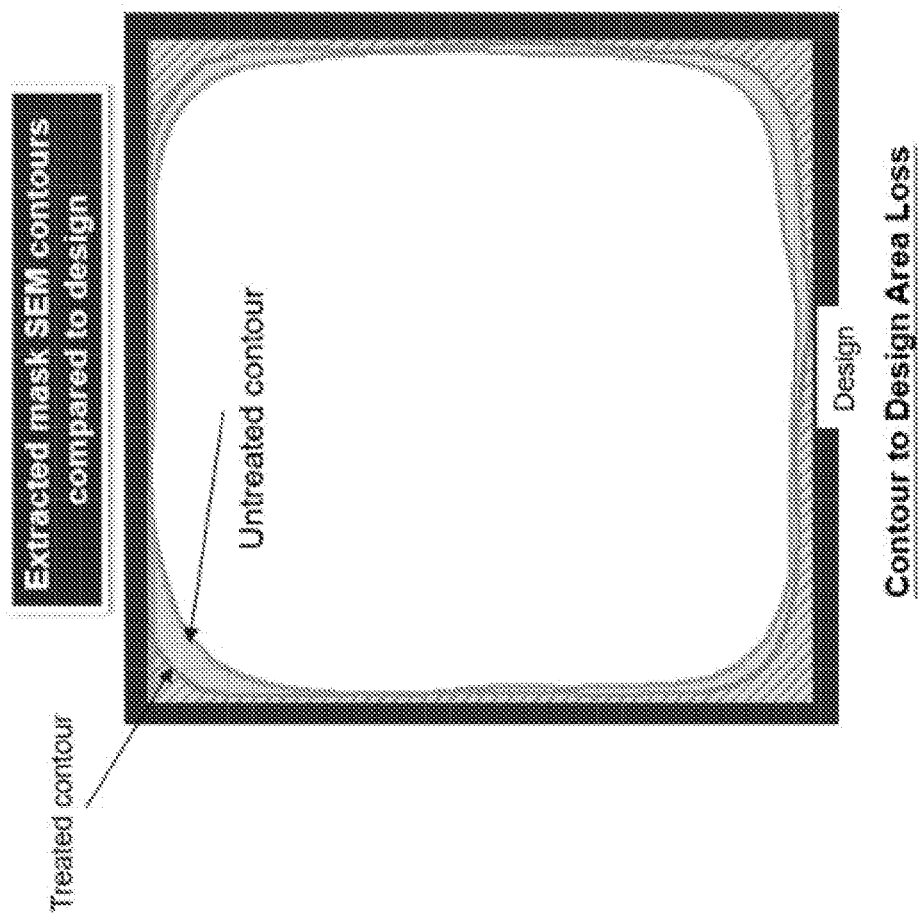
FIG. 20 depicts the improvement in contact between treated and untreated masks, in accordance with exemplary embodiments of the present invention.

FIG. 20 depicts an example of improvement in the contact holes between treated and untreated masks. As shown, the untreated contour exhibits more corner pullback compared to the treated mask.

These and other improvements can be obtained by using corrected LAMA patterns in accordance with the present invention.

Now that embodiments of the present invention have been shown and described in detail, various modifications and improvements thereon can become readily apparent to those skilled in the art. Accordingly, the exemplary embodiments of the present invention, as set forth above, are intended to be illustrative, not limiting. The spirit and scope of the present invention is to be construed broadly.

What is claimed is:

1. A method of manufacturing a photomask, comprising:
   (a) detecting wafer defects from a scanning electron microscope (SEM) image of a wafer;
   (b) extracting a plurality of mask contours from a SEM image of a previously manufactured photomask, wherein the extracted mask contours may correspond to the detected wafer defects;
   (c) generating a simulated manufactured wafer using the extracted plurality of mask contours;
   (d) detecting one or more defects on the simulated manufactured wafer;
   (e) determining one or more problematic areas of the previously manufactured photomask based on the defects on the simulated manufactured wafer;
   (f) obtaining pattern information relating to the problematic areas of the previously manufactured photomask;
   (g) conducting a spatial domain analysis of the pattern information;
   (h) determining, based on the spatial domain analysis, a plurality of photomask structure patterns that exhibit one or more corresponding defects;
   (i) generating a plurality of potential corrective photomask structure patterns from the plurality of photomask structure patterns based on the spatial domain analysis, wherein the generating comprises:
      (i) selecting a plurality of treatments to be applied to the plurality of photomask structure patterns that exhibit one or more corresponding defects; and
      (ii) for each selected treatment, selecting a plurality of parameters corresponding to the treatment; and
      (iii) applying the selected treatments with the selected parameters to the plurality of photomask structure patterns that exhibit one or more corresponding defects;
   (j) incorporating the potential corrective photomask structure patterns into a test photomask;
   (k) analyzing the potential corrective photomask structure patterns on the test photomask;
   (l) selecting a plurality of corrective photomask structure patterns from the plurality of potential corrective photomask structure patterns;
   (m) generating one or more photomask pattern correction scripts based on the analysis of the plurality of corrective photomask structure patterns on the test photomask;
   (n) executing the one or more photomask pattern correction scripts to apply one or more of the plurality of corrective photomask structure patterns to a final photomask layout for a full layer;
   (o) building a photomask for the full layer that has incorporated therein the one or more of the plurality of corrective photomask structure patterns based on the final photomask layout;
   (p) confirming that the one or more corrective photomask structure patterns have been applied to the final photomask; and
   (q) determining that a plurality of locations on a wafer produced based on the photomask that has incorporated therein the one or more of the plurality of corrective photomask structure patterns do not exhibit defects corresponding to the one or more defects by the previously manufactured photomask.

2. The method of claim 1, wherein the pattern information comprises one or more data files corresponding to a layout of the previously manufactured photomask.

3. The method of claim 1, wherein the spatial domain analysis comprises:
   (i) conducting a pattern descriptive search of the pattern information;
   (ii) identifying photomask structure patterns from the pattern information based on the pattern descriptive search; and
   (iii) generating a graph corresponding to the identified photomask structure patterns.

4. The method of claim 3, wherein the plurality of photomask structure patterns that exhibit one or more corresponding defects are identified based on the graph corresponding to the identified photomask structure patterns.

5. The method of claim 1, wherein analyzing the corrective photomask structure patterns on the test photomask comprises:
   (i) executing a manufacturing simulation process based on the test photomask; and
   (ii) evaluating results of the manufacturing simulation process.

6. The method of claim 1, wherein the potential corrective photomask structure patterns are incorporated into unused space on the previously manufactured photomask.

7. A system for manufacturing a photomask, comprising: one or more processing units; and
   a memory, wherein the one or more processing units are configured to execute machine-readable instructions that, when executed, cause the system to:
   (a) detect wafer defects from a scanning electron microscope (SEM) image of a wafer;
   (b) extract a plurality of mask contours from a SEM image of a previously manufactured photomask, wherein the extracted mask contours correspond to the detected wafer defects;
   (c) generate a simulated manufactured wafer using the extracted plurality of mask contours;
   (d) detect one or more defects on the simulated manufactured wafer;
   (e) determine one or more problematic areas of the previously manufactured photomask based on the defects on the simulated manufactured wafer;
   (f) obtain pattern information relating to the problematic areas of the previously manufactured photomask;
   (g) conduct a spatial domain analysis of the pattern information;
   (h) determine, based on the spatial domain analysis, a plurality of photomask structure patterns that exhibit one or more corresponding defects;
   (i) generate a plurality of potential corrective photomask structure patterns from the plurality of photomask structure patterns based on the spatial domain analysis, wherein the generating comprises:
      (i) selecting a plurality of treatments to be applied to the plurality of photomask structure patterns that exhibit one or more corresponding defects; and
      (ii) for each selected treatment, selecting a plurality of parameters corresponding to the treatment; and
      (iii) applying the selected treatments with the selected parameters to the plurality of photomask structure patterns that exhibit one or more corresponding defects;
   (j) incorporate the potential corrective photomask structure patterns into a test photomask;
   (k) analyze the potential corrective photomask structure patterns on the test photomask;
   (l) select a plurality of corrective photomask structure patterns from the plurality of potential corrective photomask structure patterns;
   (m) generate one or more photomask pattern correction scripts based on the analysis of the plurality of corrective photomask structure patterns on the test photomask;
   (n) execute the one or more photomask pattern correction scripts to apply one or more of the plurality of corrective photomask structure patterns to a final photomask layout for a full layer;
   (o) build a photomask for the full layer that has incorporated therein the one or more of the plurality of corrective photomask structure patterns based on the final photomask layout;
   (p) confirm that the one or more corrective photomask structure patterns have been applied to the final photomask; and
   (q) determine that a plurality of locations on a wafer produced based on the photomask that has incorporated therein the one or more of the plurality of corrective photomask structure patterns do not exhibit defects corresponding to the one or more defects by the previously manufactured photomask.

8. The system of claim 7, wherein the pattern information comprises one or more data files corresponding to a layout of the previously manufactured photomask.

9. The system of claim 7, wherein the spatial domain analysis comprises:
   (i) conducting a pattern descriptive search of the pattern information;
   (ii) identifying photomask structure patterns from the pattern information based on the pattern descriptive search; and
   (iii) generating a graph corresponding to the identified photomask structure patterns.

10. The system of claim 9, wherein the plurality of photomask structure patterns that exhibit one or more corresponding defects are identified based on the graph corresponding to the identified photomask structure patterns.

11. The system of claim 7, wherein analyzing the corrective photomask structure patterns on the test photomask comprises:
   (i) executing a manufacturing simulation process based on the test photomask; and
   (ii) visually inspecting a result of the manufacturing simulation process.

12. The system of claim 7, wherein the potential corrective photomask structure patterns are incorporated into unused space on the previously manufactured photomask.

13. A mask design correction system, comprising one or more computer systems each including one or more processors operatively connected to one or more memory devices and a plurality of modules stored in the one or more memory devices and programmed to run on one or more of the one or more processors, the plurality of modules comprising:
   (a) a scanning module configured to:
      (1) scan a first scanning electron microscope (SEM) image of a layer in a wafer;
      (2) detect wafer defects from the first SEM image of a wafer; and
      (3) output locations on the wafer having the wafer defects;

(b) a contour extraction module operatively connected to the scanning module and configured to:
  (1) obtain the locations on the wafer having wafer defects; and
  (2) extract a plurality of mask contours from a second SEM image of a previously manufactured photomask associated with the layer in the wafer, wherein the extracted mask contours correspond to the locations on the previously manufactured photomask that correspond to the detected wafer defects of the wafer;
(c) a simulation module operatively connected to the contour extraction module and configured to:
  (1) obtain the plurality of extracted mask contours; and
  (2) generate a simulated manufactured wafer using the extracted plurality of mask contours;
(d) a detection module operatively connected to the simulation module and configured to:
  (1) obtain the simulated manufactured wafer;
  (2) detect one or more defects on the simulated manufactured wafer;
  (3) output data including the defects on the simulated manufactured wafer;
(e) a photomask analysis module operatively connected to the detection module and configured to:
  (1) obtain the data including the defects on the simulated manufactured wafer;
  (2) determine one or more problematic areas of the previously manufactured photomask based on the data including the defects on the simulated manufactured wafer; and
  (3) generate pattern information relating to the problematic areas of the previously manufactured photomask;
(f) a spatial domain analysis module operatively connected to the photomask analysis module and configured to:
  (1) obtain the pattern information relating to the problematic areas of the previously manufactured photomask;
  (2) conduct a spatial domain analysis of the pattern information; and
  (3) output a result of the spatial domain analysis;
(g) a pattern identification module operatively connected to the spatial domain analysis module and configured to:
  (1) obtain the result of the spatial domain analysis;
  (2) determine, based on the result of the spatial domain analysis, a plurality of photomask structure patterns that exhibit one or more corresponding defects;
  (3) output data corresponding to the plurality of photomask structure patterns that exhibit one or more corresponding defects;
(h) a pattern generating module operatively connected to the pattern identification module and configured to:
  (1) obtain the data corresponding to the plurality of photomask structure patterns that exhibit one or more corresponding defects;
  (2) select a plurality of treatments to be applied to the plurality of photomask structure patterns that exhibit one or more corresponding defects; and
  (3) for each selected treatment, select a plurality of parameters corresponding to the treatment;
  (4) apply the selected treatments with the selected parameters to the plurality of photomask structure patterns that exhibit one or more corresponding defects;
  (5) generate a plurality of potential corrective photomask structure patterns from the plurality of photomask structure patterns based on the spatial domain analysis;
  (6) incorporate the potential corrective photomask structure patterns into a test photomask;
  (7) analyze the potential corrective photomask structure patterns on the test photomask;
  (8) select and output a plurality of corrective photomask structure patterns from the plurality of potential corrective photomask structure patterns; and
(i) a script module operatively connected to the pattern selection module and configured to:
  (1) obtain the plurality of corrective photomask structure patterns;
  (2) generate one or more photomask pattern correction scripts based on the plurality of corrective photomask structure patterns; and
  (3) execute the one or more photomask pattern correction scripts to apply one or more of the plurality of corrective photomask structure patterns to a photomask layout.

14. The system of claim 13, wherein the pattern information comprises one or more data files corresponding to a layout of the previously manufactured photomask.

15. The system of claim 13, wherein the spatial domain analysis comprises:
  (i) conducting a pattern descriptive search of the pattern information;
  (ii) identifying photomask structure patterns from the pattern information based on the pattern descriptive search; and
  (iii) generating a graph corresponding to the identified structure patterns.

16. The system of claim 15, wherein the plurality of photomask structure patterns that exhibit one or more corresponding defects are identified based on the graph corresponding to the identified photomask structure patterns.

17. The system of claim 13, wherein analyzing the corrective photomask structure patterns on the test photomask comprises:
  (i) executing a manufacturing simulation process based on the test photomask; and
  (ii) visually inspecting a result of the manufacturing simulation process.

18. The system of claim 13, wherein the potential corrective photomask structure patterns are incorporated into unused space on the previously manufactured photomask.

* * * * *